United States Patent
Nakajima et al.

(10) Patent No.: US 7,635,316 B2
(45) Date of Patent: Dec. 22, 2009

(54) CONTROL DEVICE AND METHOD FOR AUTOMATIC TRANSMISSION

(75) Inventors: Nobuyori Nakajima, Kariya (JP); Takaji Murakawa, Anjo (JP); Tetsuji Kozaki, Chita-gun (JP)

(73) Assignee: Denso Corporation, Kariya (JP)

( * ) Notice: Subject to any disclaimer, the term of this patent is extended or adjusted under 35 U.S.C. 154(b) by 466 days.

(21) Appl. No.: 11/723,156

(22) Filed: Mar. 16, 2007

(65) Prior Publication Data

US 2007/0225115 A1    Sep. 27, 2007

(30) Foreign Application Priority Data

Mar. 27, 2006   (JP)   .............. 2006-084997

(51) Int. Cl.
  *B60W 10/04*   (2006.01)
(52) U.S. Cl. .................................. 477/107
(58) Field of Classification Search ........... None
  See application file for complete search history.

(56) References Cited

U.S. PATENT DOCUMENTS 7,503,873 B2 *   3/2009   Nakajima et al. ........... 477/107
2006/0046896 A1   3/2006   Nakajima et al.

FOREIGN PATENT DOCUMENTS

| JP | 03-229932 | 10/1991 |
|---|---|---|
| JP | 5-338469 | 12/1993 |
| JP | 08-118997 | 5/1996 |
| JP | 2006-069267 | 3/2006 |

OTHER PUBLICATIONS

Japanese Office Action dated Sep. 14, 2009, issued in corresponding Japanese Application No. 2006-084997, with English translation.

* cited by examiner

*Primary Examiner*—Dirk Wright
(74) *Attorney, Agent, or Firm*—Nixon & Vanderhye, PC

(57) ABSTRACT

A hydraulic pressure of each corresponding one of a plurality of friction elements of a gear shift mechanism of the automatic transmission is controlled to downshift the gear shift mechanism from a current gear stage to a next gear stage, at which an engine brake is operated, upon receiving a driver's demand for deceleration. An engine output of the engine is increased by increasing a throttle opening degree of the engine in at least two steps in an absence of a driver's operation on an accelerator of the vehicle at the time of the downshifting of the gear shift mechanism from the current gear stage to the next gear stage.

30 Claims, 26 Drawing Sheets

| RANGE \ CLUTCH BRAKE | B0 | C0 | C1 | C2 | B1 | B2 |
|---|---|---|---|---|---|---|
| P | ○ |  | ○ |  |  |  |
| R | ○ |  | ○ |  | ○ |  |
| N | ○ |  | ○ |  |  |  |
| D 1ST SPEED | ○ |  | △ |  |  | ○ |
| D 2ND SPEED | ○ |  |  | ○ |  | ○ |
| D 3RD SPEED | ○ |  | ○ | ○ |  |  |
| D 4TH SPEED |  | ○ | ○ | ○ |  |  |
| D 5TH SPEED | ○ | ○ | ○ |  |  |  |

TARGET ENGINE ROTATIONAL SPEED IN PRELIMINARY OUTPUT INCREASE CONTROL OPERATION

PRELIMINARY OUTPUT INCREASE
CONTROL OPERATION THROTTLE
OPENING DEGREE SETTING MAP

| Nt \ COOLANT TEMP. | 20 | 40 | 60 | 80 |
|---|---|---|---|---|
| 500 | 2 | 1 | 0.5 | |
| 1000 | 2 | 2 | 1 | |
| 1500 | 4 | 3 | 2 | |

FIG. 18A

MAIN OUTPUT INCREASE CONTROL OPERATION
THROTTLE OPENING DEGREE SETTING MAP
FOR 2ND SPEED TO 1ST SPEED SHIFT

| Nt \ COOLANT TEMP. | 20 | 40 | 60 | 80 |
|---|---|---|---|---|
| 500 | 5 | 4 | 3 | 2 |
| 1000 | 8 | 6 | 5 | |
| 1500 | 10 | 8 | 7 | |

FIG. 18B

MAIN OUTPUT INCREASE CONTROL OPERATION
THROTTLE OPENING DEGREE SETTING MAP
FOR 3RD SPEED TO 2ND SPEED SHIFT

| Nt \ COOLANT TEMP. | 20 | 40 | 60 | 80 |
|---|---|---|---|---|
| | | | | |

CONTROL DEVICE AND METHOD FOR AUTOMATIC TRANSMISSION

CROSS REFERENCE TO RELATED APPLICATION

This application is based on and incorporates herein by reference Japanese Patent Application No. 2006-84997 filed on Mar. 27, 2006.

BACKGROUND OF THE INVENTION

1. Field of the Invention

The present invention relates to control device and method for an automatic transmission.

2. Description of Related Art

In a recent automatic transmission of a vehicle, a hydraulic control circuit is switched to engage or disengage each corresponding one of a plurality of friction elements (e.g., hydraulic clutches and brakes) and thereby to select a gear stage from a plurality of gear stages. When the vehicle travels a downhill, a driver often tries to use an engine brake by removing his/her foot from an accelerator pedal. However, if a slope of the downhill is relatively steep, a sufficient engine brake cannot be attained by simply removing the foot from the accelerator pedal. In such a case, the driver turns off an over drive switch or changes a shift lever from a D range to an S range or L range to downshift the automatic transmission, so that the sufficient engine brake is exerted.

When the downshift is performed to increase the engine brake force based on a driver's demand for deceleration (based on the deceleration operation of the driver) at the undepressed state of the accelerator pedal, a gear ratio of the automatic transmission becomes larger due to the downshift. Therefore, it is required to increase a rotational speed of the engine in the amount that corresponds to the change amount of the gear ratio. However, since a throttle valve is normally closed in an operational mode, which requires such an engine brake force, the torque at an output side is transmitted to an engine side by torque transmission by friction elements for achieving a shift range after the downshift, resulting in an increase of an engine rotational speed. Therefore, an effect of the engine brake cannot be obtained at the required timing due to a longer gear shift period, or inertia torque occurs as braking torque of the vehicle due to the increase of the engine rotational speed, so that the engine brake force is temporarily increased, generating a shift shock. In addition, when the transmission torque of the friction elements is abruptly increased due to the controlling of the hydraulic pressure of the automatic transmission or the like, the engine rotational speed is quickly increased to shorten the shift time and in contrast, the braking torque is abruptly increased, further increasing the shift shock.

Japanese Patent JP-B2-2924463 teaches a gear shift control device of an automatic transmission. According to Japanese Patent JP-B2-2924463, an engine output increasing means of the gear shift control device temporarily increases an engine output when an automatic transmission is downshifted to a lower shift range in which an engine brake works substantially in the undepressed state of the accelerator pedal. A timer of the gear shift control device counts an elapsed time, which is counted up, i.e., is measured from a predetermined count start point such as a shift output point for switching, for example, a hydraulic control circuit at downshifting. An engine output increase control operation is started by the engine output increasing means based on the elapsed time period, which is counted by the timer. Specifically, the engine output increasing means increases the engine rotational speed after the time of starting the disengagement (slipping) of the off-going friction element at the higher speed gear stage but before the completion of the engagement of the on-coming friction element based on the elapsed time period, which is counted up, i.e., is measured with the timer. This timing for starting the engine output increase control operation is set based on the operational state of the vehicle (e.g., the hydraulic pressure in the hydraulic pressure control circuit and the engine rotational speed), which has the influence on at least one of the engagement/disengagement delay time period of the friction element and the engine output increase delay.

In addition, Japanese Patent JP-B2-2924463 teaches that the timing for starting the increasing of the engine rotational speed may be set in view of a delay in the disengagement/engagement of the corresponding friction element and/or a delay in the start of the increasing of the engine output to reduce the required gear shift time period while limiting the gear shift shock. Also, Japanese Patent JP-B2-2924463 teaches that it is desirable to control the opening degree of the throttle valve to increase the engine output in consistent with the timing of starting the slipping of the off-going friction element.

However, the delay in the engagement/disengagement of the friction element at the time of the downshift is changed not only depending on the hydraulic pressure of the hydraulic control circuit and the engine rotational speed but also depending on the vehicle speed and the torque applied to the friction element at the time of the downshift. Particularly, at the time of the downshift, the accelerator pedal is fully released to substantially, fully close the accelerator. Thus, it is required to consider the application of the engine side drive torque, which is equal to or lower than the road load torque (i.e., the torque that is required to travel at the constant speed at that time). Furthermore, the above delay is also influenced by the operational state in the slip control operation of the lock-up clutch. Thus, at the time of setting the timing for starting the engine output increase control operation, even when influences of the hydraulic fluid (oil) temperature and the engine rotational speed are considered, it is not always possible to start the throttle valve opening degree control operation (the engine output increase control operation) at the appropriate timing. Thus, the timing for starting the throttle valve opening degree control operation may possibly be deviated from the appropriate timing to cause the feeling of the acceleration and the gearshift shock to the driver due to the throttle valve opening degree control operation at the time of the downshift. Furthermore, in order to appropriately set the reference value of the timer in view of the influences of the hydraulic fluid temperature and the engine rotational speed, the reference value of the timer needs to be set based on the repeated experiments. Also, the reference value of the timer needs to be set when the way of depressurizing the hydraulic fluid needs to be changed due to a change in the specification of the transmission hydraulic pressure control device. Therefore, the logic is complicated, and the many parameters need to be set. Thus, the adjustment of the parameters takes a large amount of time.

In order to address the above disadvantage, JP-2006-A-69267 (corresponding to US 2006/0046896 A1) teaches another technique. According to this technique, a reduction in an input shaft rotational speed or a reduction in a gear ratio in a gear shift mechanism of the automatic transmission is sensed at the time of occurrence of the slipping of the off-going friction element at the higher speed gear stage at the time of the downshift to start the engine output increase control operation.

The inventors of the present application have found through the experimental study that even when the off-going friction element is released at the time of the downshift, the input shaft rotational speed or the gear ratio of the gear shift mechanism does not decrease in some cases (e.g., at the time of shifting from the third speed to the second speed in an automatic transmission that is similar to one shown in FIG. 3). In such a case, the engine output increase control operation cannot be started at the time of the downshift, and thereby the gear shift cannot proceed.

Furthermore, even in the case where the reduction in the input shaft rotational speed or the gear ratio is sensed at the time of the downshift, when the engine output increase control operation is started after the reduction of the input shaft rotational speed or the gear ratio to a corresponding predetermined value, a difference between the gear ratio at the time of starting the engine output increase control operation and the gear ratio after the gear shift (the input shaft rotational speed after the gear shift) is increased to cause lengthening of the entire gear shift time period.

SUMMARY OF THE INVENTION

The present invention addresses the above disadvantages. According to one aspect of the present invention, there is provided a control device for an automatic transmission connected with an internal combustion engine of a vehicle. The control device includes a hydraulic pressure control means, a downshift control means and an engine output increase control means. The hydraulic pressure control means is for controlling a hydraulic pressure of each corresponding one of a plurality of friction elements of a gear shift mechanism of the automatic transmission to selectively place each corresponding one of the plurality of friction elements in one of an engaged state and a disengaged state to shift a gear stage of the gear shift mechanism. The downshift control means is for executing a downshift control operation to control the hydraulic pressure of each corresponding one of the plurality of friction elements and thereby to downshift the gear shift mechanism from a current gear stage to a next gear stage (any another gear stage), at which an engine brake is operated, upon receiving a driver's demand for deceleration. The engine output increase control means is for executing an engine output increase control operation to increase an engine output of the engine in an absence of a driver's operation on an accelerator of the vehicle during the downshift control operation, which is executed by the downshift control means. When the engine output increase control means executes the engine output increase control operation, the engine output increase control means executes a preliminary output increase control operation to preliminarily, slightly increase the engine output and then executes a main output increase control operation to substantially increase the engine output in preparation for downshifting of the gear shift mechanism to the next gear stage.

According to another aspect of the present invention, there is provided a control device for an automatic transmission connected with an internal combustion engine of a vehicle. The control device includes a hydraulic pressure control means, a downshift control means and an engine output increase control means. The hydraulic pressure control means is for controlling a hydraulic pressure of each corresponding one of a plurality of friction elements of a gear shift mechanism of the automatic transmission to selectively place each corresponding one of the plurality of friction elements in one of an engaged state and a disengaged state to shift a gear stage of the gear shift mechanism. The downshift control means is for controlling the hydraulic pressure of each corresponding one of the plurality of friction elements to downshift the gear shift mechanism from a current gear stage to a next gear stage, at which an engine brake is operated, upon receiving a driver's demand for deceleration. The engine output increase control means is for increasing an engine output of the engine by increasing a throttle opening degree of the engine in at least two steps in an absence of a driver's operation on an accelerator of the vehicle at the time of the downshifting of the gear shift mechanism by the downshift control means from the current gear stage to the next gear stage.

According to another aspect of the present invention, there is also provided a method for controlling an automatic transmission connected with an internal combustion engine of a vehicle. According to the method, a hydraulic pressure of each corresponding one of a plurality of friction elements of a gear shift mechanism of the automatic transmission is controlled to downshift the gear shift mechanism from a current gear stage to a next gear stage, at which an engine brake is operated, upon receiving a driver's demand for deceleration. An engine output of the engine is increased by increasing a throttle opening degree of the engine in at least two steps in an absence of a driver's operation on an accelerator of the vehicle at the time of the downshifting of the gear shift mechanism from the current gear stage to the next gear stage.

BRIEF DESCRIPTION OF THE DRAWINGS

The invention, together with additional objectives, features and advantages thereof, will be best understood from the following description, the appended claims and the accompanying drawings in which:

FIG. 18A is a diagram showing an example of a main output increase control operation throttle opening degree setting map in a case of gear shift from a second speed to a first speed according to the first embodiment;

FIG. 18B is a diagram showing an example of a main output increase control operation throttle opening degree setting map in a case of gear shift from a third speed to the second speed according to the first embodiment;

DETAILED DESCRIPTION OF THE INVENTION

First Embodiment

Figure 1:
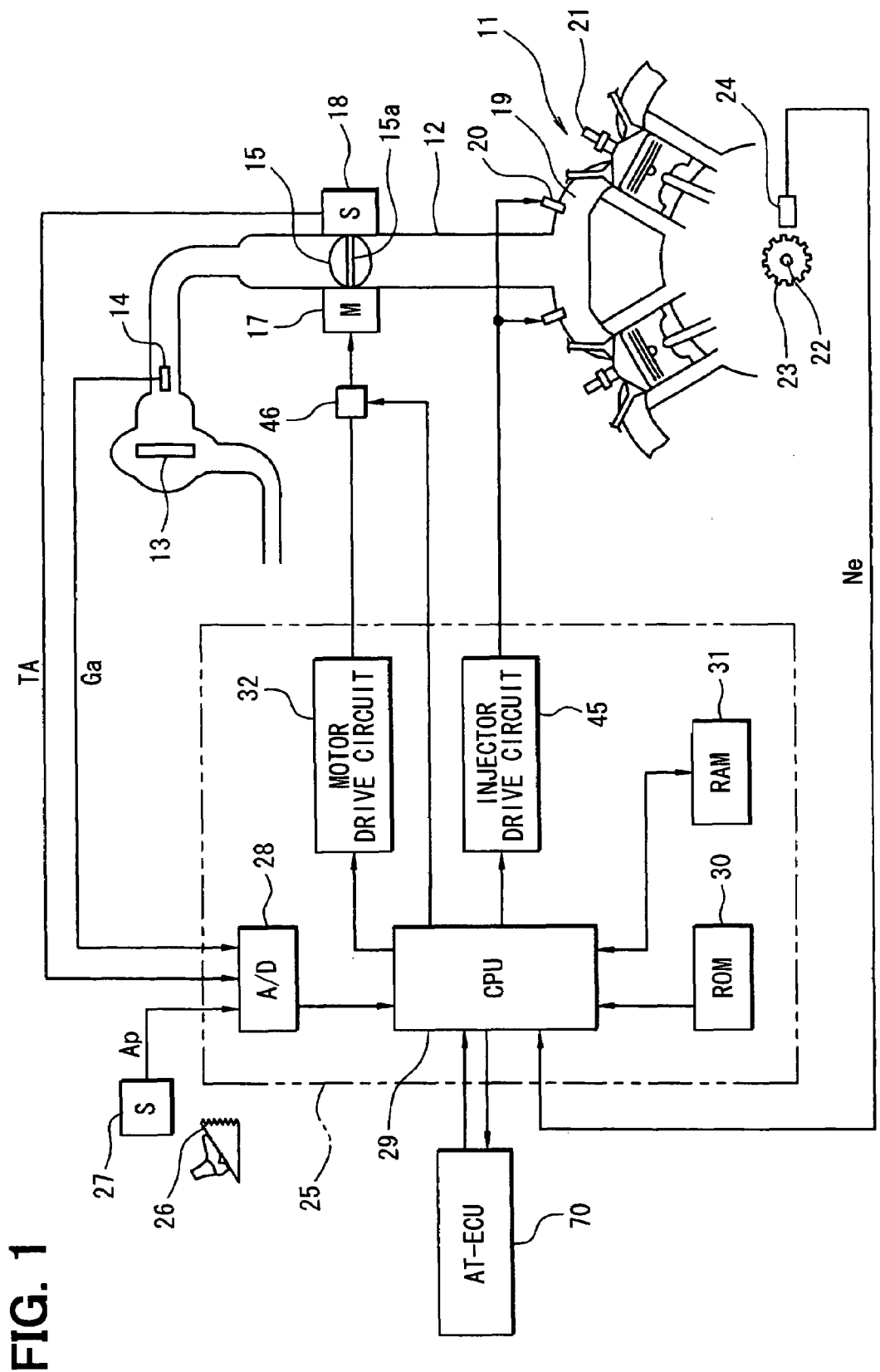
FIG. 1 is a schematic structural diagram showing an entire engine control system according to a first embodiment of the present invention.

With reference to FIG. 1, a schematic construction of an entire control system for an internal combustion engine (hereinafter, simply referred to as an engine) 11 will be described. An air cleaner 13 is provided in an intake pipe 12 of the engine 11 at an upstream end side thereof. An air flow meter 14, which measures an intake air quantity Ga, is provided on the downstream side of the air cleaner 13. A throttle valve 15 is provided on the downstream side of the air flow meter 14. A motor (e.g., a DC motor) 17 is connected to a rotatable shaft 15a of the throttle valve 15. An opening degree (a throttle opening degree) of the throttle valve 15 is controlled by a drive force of the motor 17. The throttle opening degree is detected by a throttle opening degree sensor 18.

Each injector 20 is installed to an intake manifold 19, which introduces intake air, which has passed through the throttle valve 15, into a corresponding cylinder of the engine 11. Each spark plug 21 is installed to a cylinder head at the corresponding cylinder of the engine 11. A crank angle sensor 24 (engine rotational speed detecting means) is positioned to oppose an outer periphery of a signal rotor 23, which is fixed to a crankshaft 22 of the engine 11. Pulses of the engine rotational speed signal Ne outputted from the crank angle sensor 24 are taken in an engine ECU 25 (engine control computer) to detect an engine rotational speed based on a pulse frequency of the engine rotational speed signal Ne.

A depressed amount (an accelerator opening degree) of an accelerator pedal (or simply referred to as an accelerator) 26 is detected by an accelerator sensor 27 (accelerator opening degree sensing means). A voltage signal Ap, which corresponds to the depressed amount of the accelerator pedal 26, is supplied to the engine ECU 25 through an A/D converter 28. In addition, a measured intake air quantity Ga, which is detected by the air flow meter 14, and a measured throttle opening degree TA, which is detected by the throttle opening degree sensor 18, are supplied to the engine ECU 25 through the A/D converter 28.

The engine ECU 25 includes a microcomputer as its main component. The microcomputer includes a CPU 29, a ROM 30 and a RAM 31. The ECU 25 executes various engine control routines, which are stored in the ROM 30, at the CPU 29 to control ignition timing of the spark plug 21 and also to control a pulse width of an injection signal supplied to the injector 20 through an injector drive circuit 45, thus controlling a fuel injection quantity.

In addition, the engine ECU 25 executes various throttle control routines stored in the ROM 30 at the CPU 29 to perform a feedback-control operation of the motor 17 of the throttle valve 15 through a motor drive circuit 32 by PID control or the like, so that the throttle opening degree detected by the throttle opening degree sensor 18 becomes equal to a target throttle opening degree. When the electronic throttle system fails, a safety circuit 46, which is disposed in a power supply path from the motor drive circuit 32 to the motor 17, is activated, so that the power supply to the motor 17 is kept in an off-state. In this state, the throttle opening degree is held in a predetermined value, which enables limp home mode traveling of the vehicle.

Next, a schematic construction of an automatic transmission 51 will be described with reference to FIGS. 2 and 3. As shown in FIG. 3, an input shaft 53 of a torque converter 52 is connected to an output shaft of the engine 11. A transmission gear mechanism 55 (transmission mechanism), which is driven by a hydraulic pressure, is connected to an output shaft 54 of the torque converter 52. A pump impeller 71 and a turbine runner 72, which form a fluid coupling, are opposed with each other inside the torque converter 52. A stator 73, which rectifies a flow of hydraulic fluid (oil), is disposed between the pump impeller 71 and the turbine runner 72. The pump impeller 71 is connected to the input shaft 53 of the torque converter 52, and the turbine runner 72 is connected to the output shaft 54 of the torque converter 52.

A lockup clutch 56 is provided in the torque converter 52 to connect and disconnect between the input shaft 53 and the output shaft 54. The output torque of the engine is transmitted to the transmission gear mechanism 55 through the torque converter 52. In the transmission gear mechanism 55, the transmitted output torque of the engine is converted to achieve a desired rotational speed thorough a plurality of gears and is outputted to drive wheels (front wheels or rear wheels) of a vehicle.

Clutches C0, C1, C2, brakes B0, B1, B2 and one-way clutches F0, F1 are provided in the transmission gear mechanism 55 and serve as "selectively engageable friction elements", which are selectively engaged and disengaged to select a desired gear stage among a plurality of gear stages (i.e., a plurality of gear ratios). As shown FIG. 4, engagement/disengagement of each of the clutches C0, C1, C2 and the brakes B0, B1, B2 is hydraulically controlled to change a combination of gears for transmitting power and thereby to change the gear ratio.

Figures 4, 7:
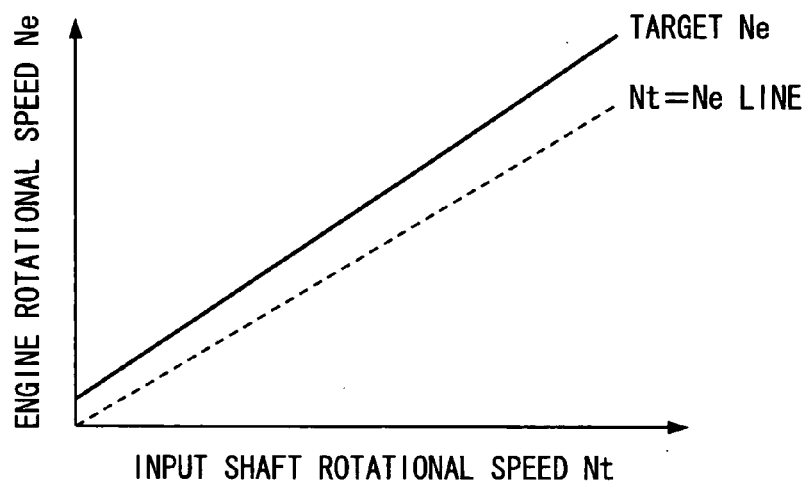
FIG. 4 is a diagram showing engagement/disengagement combinations of clutches and brakes for respective gear stages according to the first embodiment.
FIG. 7 is a graph showing a way of setting a target engine rotational speed for a preliminary output increase control operation according to the first embodiment.

FIG. 4 shows combinations of engaged ones selected from the clutches C0, C1, C2 and the brakes B0, B1, B2 in a five-speed automatic transmission. In FIG. 4, a sign of "◯" indicates the corresponding clutch or brake, which is held in an engaged state (a torque transmitting sate) at the corresponding gear stage. Furthermore, a sign of "Δ" indicates the corresponding clutch or brake, which is held in the engaged state at the time of applying engine brake. Also, each blank cell indicates the corresponding clutch or brake, which is held in the disengaged state. For example, when the accelerator pedal is progressively depressed in the D range, the vehicle speed increases. During this stage, the gears are shifted up from the first speed, the second speed, the third speed, the fourth speed and the fifth speed. At the time of shifting from the first speed to the second speed, in addition to the brakes B0 and B2, which have been already placed in the engaged state, the clutch C2 is also placed in the engaged state. Here, it should be noted that when the clutch C1 is engaged in the first speed at the time of applying the engine brake, the clutch C1 is disengaged in the second speed. At the time of shifting from the second speed to the third speed, the brake B2 is placed in the disengaged state while the brake B0 and the clutch C2 are kept in the engaged state, and the clutch C1 is additionally placed in the engaged state. At the time of shifting from the third speed to the fourth speed, the brake B0 is placed in the disengaged state while the clutches C1, C2 are kept in the engaged state, and the clutch C0 is additionally placed in the engaged state. At the time of shifting from the fourth speed to the fifth speed, the clutch C2 is placed in the disengaged state while the clutches C0, C1 are kept in the engaged state, and the brake B0 is additionally placed in the engaged state.

Figure 2:
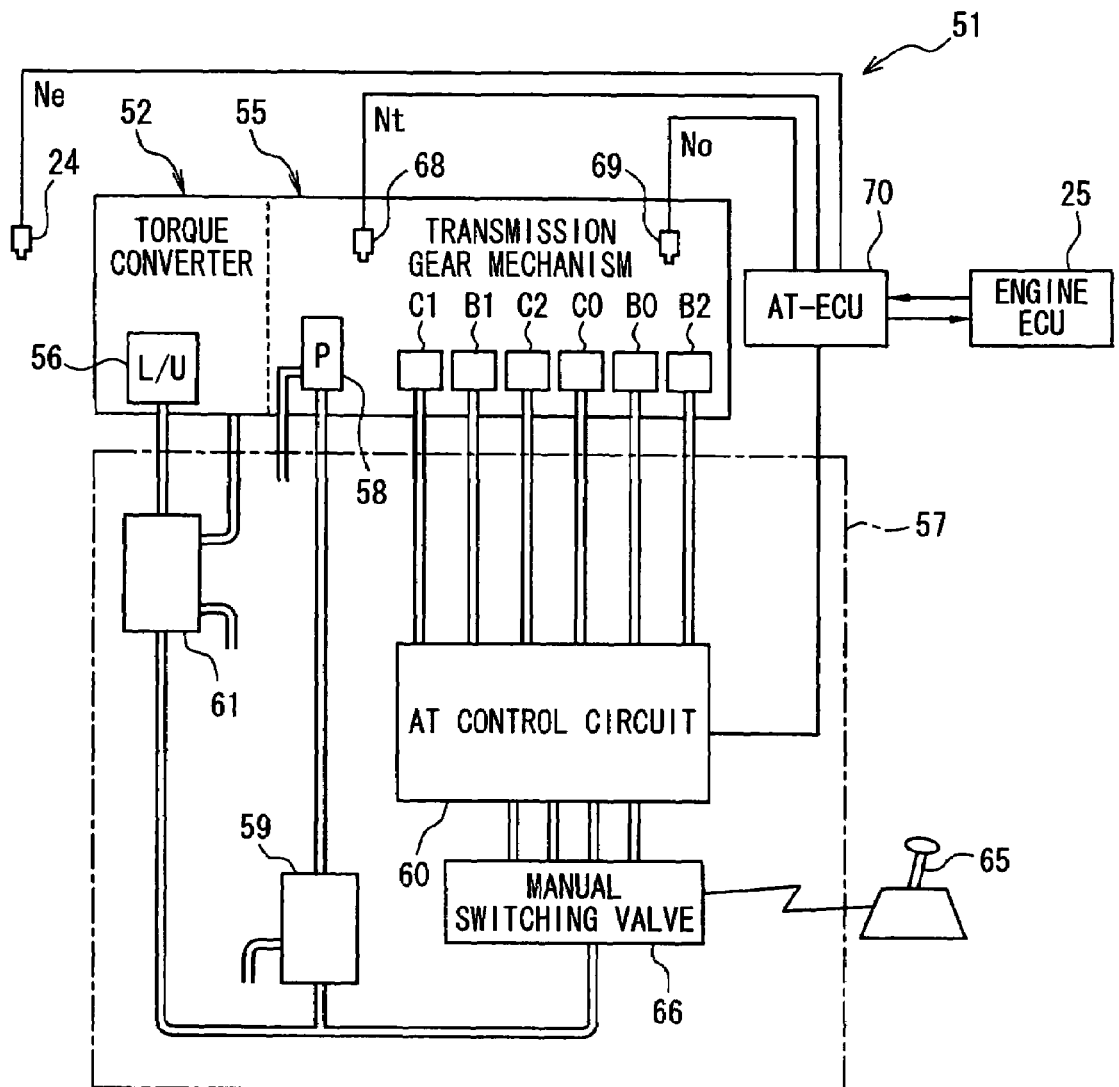
FIG. 2 is a schematic structural diagram showing an automatic transmission according to the first embodiment.
Figure 3:
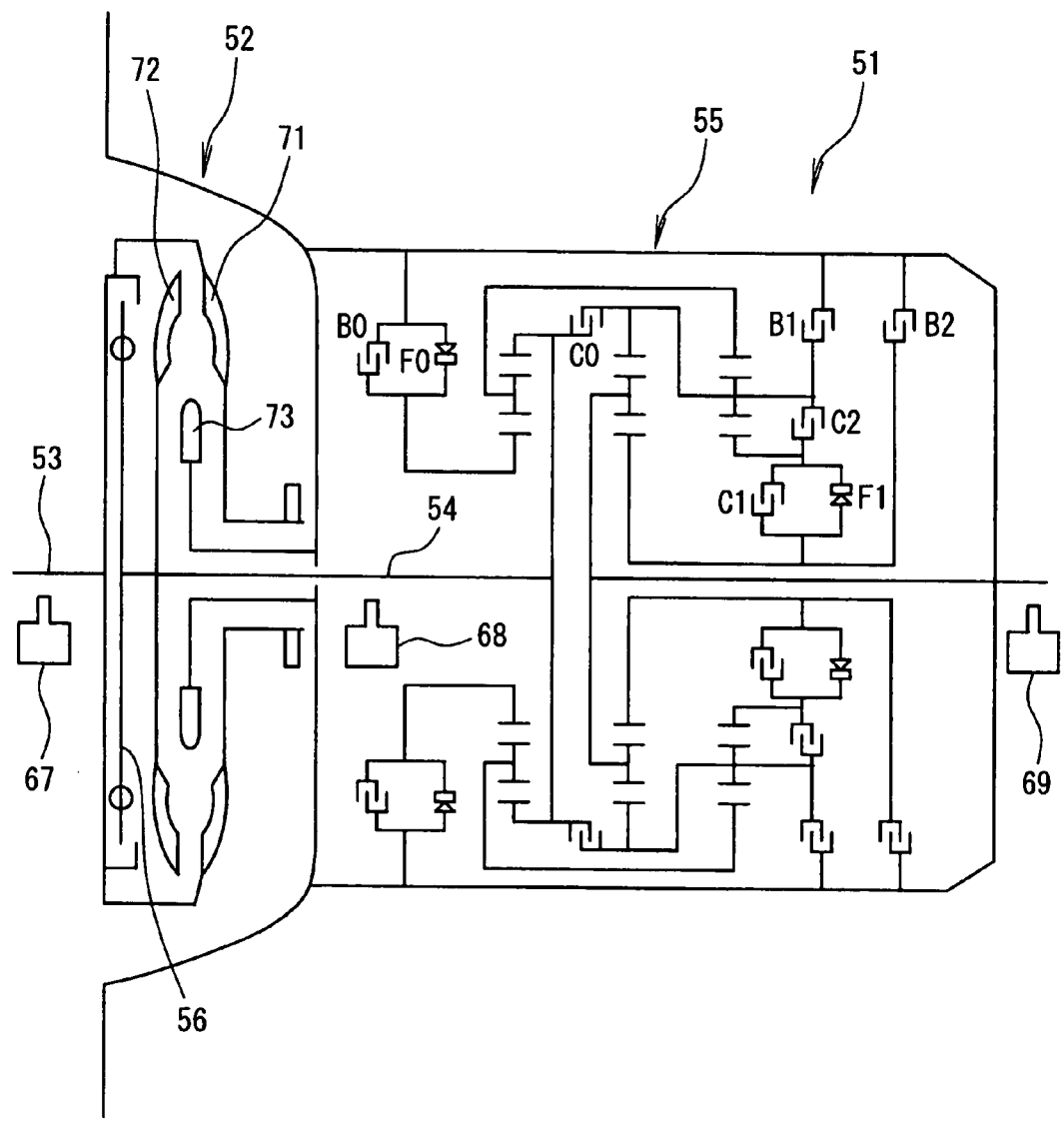
FIG. 3 is a diagram showing a mechanical construction of the automatic transmission according to the first embodiment.

As shown in FIG. 2, a hydraulic pump 58, which is driven by engine power, is provided in the transmission gear mechanism 55. A hydraulic control circuit 57 is provided in an oil pan (not shown), which reserves the hydraulic fluid. The hydraulic control circuit 57 includes a line pressure control circuit 59, an automatic transmission (AT) control circuit 60, a lockup control circuit 61 and a manual switching valve 66. The hydraulic fluid, which is taken from the oil pan by the hydraulic pump 58, is supplied to the automatic transmission control circuit 60 and the lockup control circuit 61 through the line pressure control circuit 59. A hydraulic control valve (not shown) is provided in the line pressure control circuit 59 to control the hydraulic pressure, which is supplied from the hydraulic pump 58, to a predetermined line pressure. A plurality of hydraulic control valves (hydraulic control means) are provided in the automatic transmission control circuit 60 to control the hydraulic pressure, which is supplied to the clutches C0, C1, C2 and the brakes B0, B1 of the transmission gear mechanism 55. In addition, a hydraulic control valve (not shown) is provided in the lockup control circuit 61 to control the hydraulic pressure supplied to the lockup clutch 56.

Each hydraulic control valve is formed as, for example, a linear solenoid valve, which is opened and closed by an electromagnetic attractive force generated upon application of electric current at a predetermined duty ratio to control the hydraulic pressure. Therefore, in the hydraulic control valve, the electric current and the hydraulic pressure have a close relationship with each other, and the hydraulic pressure is controlled by controlling the current value. In addition, in order to limit variations in the current value with respect to the duty ratio, the current value is monitored by a current detector (not shown) of an automatic transmission electronic control circuit 70 (hereinafter referred to as "AT-ECU") to perform a feedback-control operation of the current value.

The manual switching valve 66, which is switched through a corresponding operation of a shift lever 65, is provided between the line pressure control circuit 59 and the automatic transmission control circuit 60. In a state where the shift lever 65 is placed in a neutral range (N range) or a parking range (P range), even when the power supply to the hydraulic control valves of the automatic transmission control circuit 60 is turned off, the manual switching valve 66 can be operated to change the hydraulic pressure, which is supplied to the transmission gear mechanism 55, to place the transmission gear mechanism 55 in the neutral state.

An input shaft rotational speed sensor (an input shaft rotational speed sensing means) 68 and an output shaft rotational speed sensor (an output shaft rotational speed sensing means) 69 are provided in the transmission gear mechanism 55. The input shaft rotational speed sensor 68 detects an input shaft rotational speed Nt (an output shaft rotational speed of the torque converter 52) of the transmission gear mechanism 55. The output shaft rotational speed sensor 69 detects an output shaft rotational speed No of the transmission gear mechanism 55.

Output signals of the above sensors are inputted to the AT-ECU 70. The AT-ECU 70 includes a microcomputer as its main component and performs the respective routines, which are stored in a ROM (memory medium) thereof. Thereby, the power supply to the respective hydraulic control valves in the automatic transmission control circuit 60 is controlled in accordance with an operational position of the shift lever 65 and an operational condition of the engine (e.g., the throttle opening degree, the vehicle speed) to change the hydraulic pressures applied to the clutches C0, C1, C2 and the brakes B0, B1, B2 of the transmission gear mechanism 55. As a result, as shown in FIG. 4, the engaged states/the disengaged states of the corresponding ones of the clutches C0, C1, C2 and the brakes B0, B1, B2 are changed to change the combination of the gears, which transmit the drive force, and thereby the gear ratio of the transmission gear mechanism 55 is changed.

Figure 5:
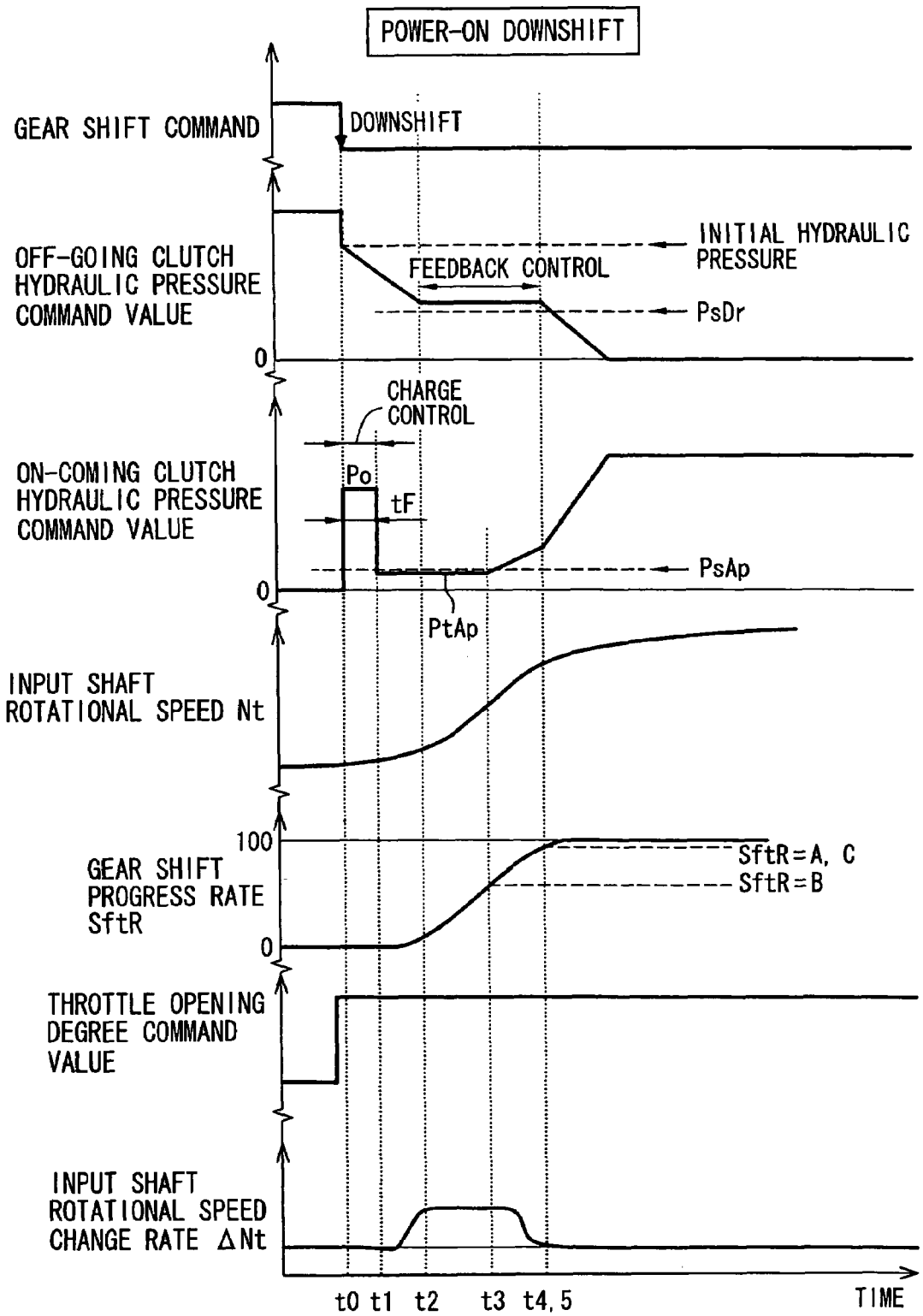
FIG. 5 is a time chart showing a power-on downshift control operation according to the first embodiment.
Figure 6:
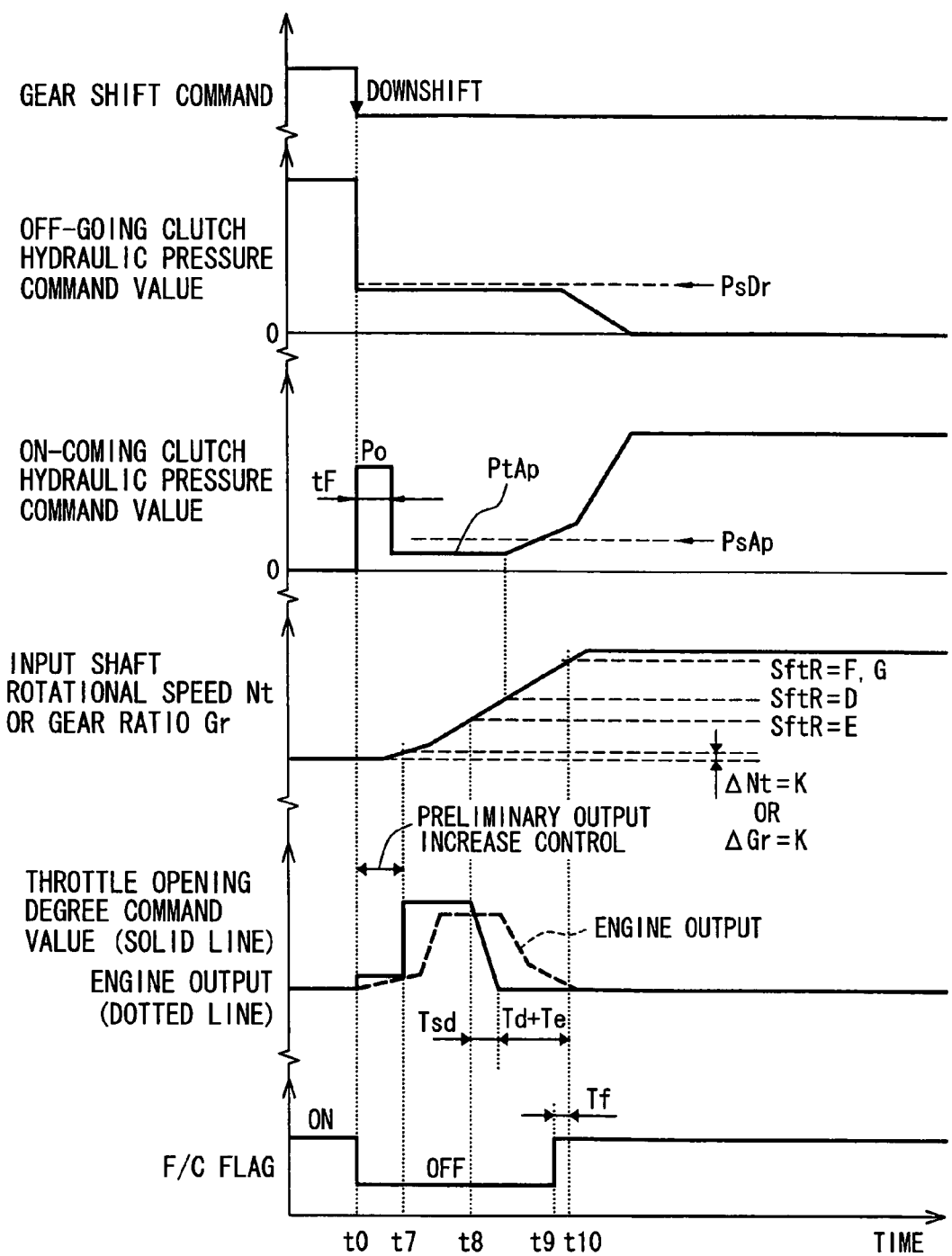
FIG. 6 is a time chart showing an ETC cooperative downshift control operation according to the first embodiment.

At this time, when the downshift is performed from the current gear ratio (the current gear stage) to a target gear ratio (a target gear stage), the AT-ECU 70 performs the corresponding downshift operation shown in FIG. 5 or 6. In the following description, the clutches C0, C1, C2 and the brakes B0, B1, B2 will be simply referred to as "clutches" for the sake of simplicity. In addition, in the downshift control operation, the clutch, which is changed from the engaged state to the disengaged state will be referred to as "off-going clutch", and the clutch, which is changed from the disengaged state to the engaged state, will be referred to as "on-coming clutch".

FIG. 5 is a time chart showing an exemplary control operation of "a power-on downshift operation", in which the driver presses the accelerator pedal 26 to downshift. FIG. 6 is a time chart showing an exemplary control operation of "an electronic throttle control (ETC) cooperative downshift operation", in which an engine output increase control operation is performed during a period of the downshift operation, which is triggered by the driver (driver's demand for deceleration) to apply engine brake.

First, the exemplary control operation of the power-on downshift operation will be described with reference to FIG. 5.

When the driver deeply depresses the accelerator pedal 26 to abruptly increase the throttle opening degree, it is determined that the power-on downshift operation is demanded, and thereby a downshift command is outputted. At this time point t0, a hydraulic pressure command value of the off-going clutch is reduced to an initial hydraulic pressure value, and thereafter the hydraulic pressure command value of the off-going clutch is further reduced at a predetermined rate. Thereby, the engaging force of the off-going clutch is reduced, so that the engine load is reduced. Therefore, an input shaft rotational speed Nt of the transmission gear mechanism 55 (an output shaft rotational speed of the torque converter 52) begins to increase.

In addition, at the time point to, at which the downshift command is generated, i.e., outputted, a charge control operation is performed on the on-coming clutch to charge the hydraulic fluid to the on-coming clutch. Specifically, a hydraulic pressure command value of the on-coming clutch is set to a predetermined charge hydraulic pressure Po to place the on-coming clutch in a pre-engaging state that is immediately before the engaging force is exerted by the on-coming clutch to place the on-coming clutch in the engaged state, and thereafter the hydraulic fluid is charged to the on-coming clutch. This charge control operation is performed only for a predetermined time period tF, so that the on-coming clutch is placed in the pre-engaging state, which is immediately before exertion of the engaging force by the on-coming clutch, at a time point t1. At this time point t1, the hydraulic pressure command value of the on-coming clutch is reduced to a standby hydraulic pressure PtAp, and the current charge control operation is terminated. Thereafter, the on-coming clutch is held by the standby hydraulic pressure PtAp in the pre-engaging state that is immediately before exertion of the engaging force. This standby hydraulic pressure PtAp is set to be lower than but is close (adjacent to) to a hydraulic pressure PsAp, which corresponds to a set load of a return spring of the on-coming clutch, which exerts an urging force to the on-coming cultic in a disengaging direction.

Thereafter, at a time point t2, a substantial increase in the input shaft rotational speed Nt is detected, i.e., a change rate ΔNt of the input shaft rotational speed Nt becomes equal to or greater than a predetermined threshold value. At this time point t2, the hydraulic pressure of the off-going clutch is feedback-controlled, so that an increase rate of the input shaft rotational speed Nt becomes a predetermined value. During this feedback-control operation, the hydraulic pressure command value of the off-going clutch is slightly higher than a predetermined hydraulic pressure PsDr, which corresponding to a set load of the return spring of the off-going clutch. Then, at a time point t3, a gear shift progress rate SftR reaches a predetermined value B. At this time point t3, a hydraulic pressure increase control operation for increasing the hydraulic pressure command value of the on-coming clutch at a predetermined rate is started. The gear shift progress rate SftR is obtained as follows: SftR=100×(input shaft rotational speed Nt−output shaft rotational speed No×a gear ratio before gear shifting)/(output shaft rotational speed No×a gear ratio after gear shifting−output shaft rotational speed No×a gear ratio before gear shifting). Thereafter, at a time point t4, the gear shift progress rate SftR reaches a predetermined value A.

At this time point t4, the hydraulic pressure command value of the off-going clutch is reduced at a constant rate.

Then, at a time point t5, the gear shift progress rate SftR reaches a predetermined value C. At this time point t5, the hydraulic pressure command value of the on-coming clutch is set to a maximum value, and the hydraulic pressure of the on-coming clutch is increased the maximum value. In this way, the engaging force of the on-coming clutch is increased to cause engagement of the on-coming clutch at the appropriate timing, at which the input shaft rotational speed Nt is increased to the corresponding rotational speed that corresponds to the rotational speed of the lower target gear stage (the lower target gear ratio), to which the downshift is targeted. Thereby the downshift is completed.

Next, the ETC cooperative downshift control operation will be described with reference to FIG. 6. At a time point t0, an execution condition for executing the ETC cooperative downshift control operation is satisfied, and a downshift command is outputted. At this time point t0, the hydraulic pressure command value of the off-going clutch is quickly reduced to a predetermined hydraulic pressure, which is slightly lower than a hydraulic pressure PsDr that corresponds to a set load of the return spring of the on-coming clutch. Thereby, the hydraulic pressure of the off-going clutch is quickly reduced. Alternatively, at the time point t0, at which the downshift command is outputted, the hydraulic pressure command value of the off-going clutch may be quickly reduced to a minimum hydraulic pressure (zero kPa) or a hydraulic pressure therearound. In this way, the hydraulic pressure of the off-going clutch can be quickly reduced below a hydraulic pressure, which corresponds to a nominal transmission torque capacity.

Even in the ETC cooperative downshift control operation, the hydraulic pressure control operation of the on-coming clutch is substantially the same as that of the power-on downshift operation. Specifically, at the time point t0, at which the downshift command is outputted, the charge control operation is performed by setting the hydraulic pressure command value of the on-coming clutch to a predetermined charge hydraulic pressure Po, and thereafter the hydraulic fluid is charged to the on-coming clutch. This charge control operation is performed only for a predetermined time period tF. At the end of the predetermined time period tF, when the on-coming clutch reaches the state immediately before exertion of the engaging force, the hydraulic pressure command value of the on-coming clutch is reduced to a standby hydraulic pressure PtAp (the hydraulic pressure that is close to the hydraulic pressure PsAp, which corresponds to the set load of the return spring of the on-coming clutch), and then the charge control operation is terminated. Thereafter, the on-coming clutch maintains the engaging force to be in a state where a desired engine brake feeling is caused by the standby hydraulic pressure PtAp by the on-coming clutch. The subsequent hydraulic pressure increase control operation is performed in the same manner as that of the above-mentioned power-on downshift operation.

The ETC cooperative downshift control operation has the following characteristic feature. That is, when the engine output increase control operation for increasing the engine output is performed in an absence of the accelerator pedal operation of the driver during the downshift control operation, the preliminary output increase control operation for preliminarily increasing the engine output slightly is performed, and then the main output increase control operation for increasing the engine output for the next gear stage (gear ratio) on a large scale is performed.

In the first embodiment, the off-going friction element of the higher speed gear stage is quickly disengaged right after the start of the downshift control operation. In view of this, the preliminary output increase control operation is started immediately at the time point t0, at which the downshift control operation is started (or at the time point, at which a disengaging command of the off-going friction element is outputted).

Figures 16, 17:
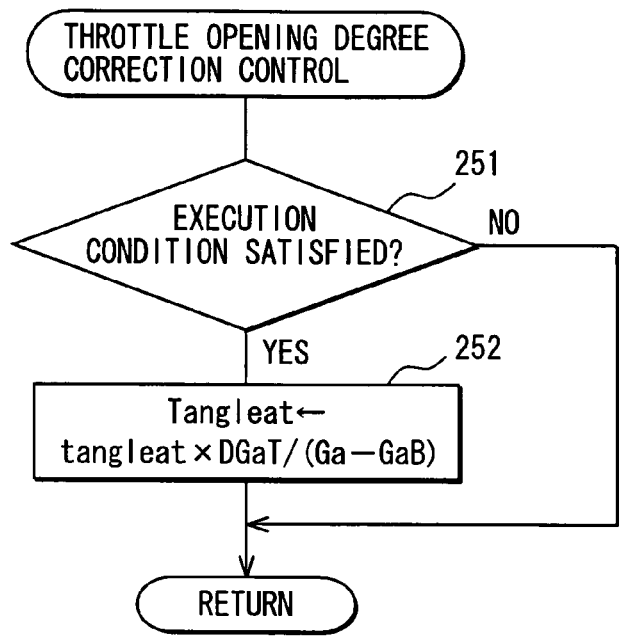
FIG. 16 is a flowchart showing a throttle opening degree correction control routine according to the first embodiment.
FIG. 17 is a diagram showing a preliminary output increase control operation throttle opening degree setting map according to the first embodiment.

During the preliminary output increase control operation, the engine output (throttle opening degree) may be set based on the operational condition (for example, the input shaft rotational speed Nt and the engine coolant temperature) in view of a preliminary output increase control operation throttle opening degree setting map shown in FIG. 17. However, it is desirable to slightly increase the input rotational speed Nt or the gear ratio Gr of the transmission gear mechanism 55 when the off-going friction element of the higher speed gear stage is disengaged. This is because of the following reason. That is, when the amount of increase in the engine output in the preliminary output increase control operation is excessively large, the vehicle is disadvantageously accelerated in the state where the off-going friction element of the higher speed gear stage is not sufficiently disengaged. Also, when the amount of increase in the engine output in the preliminary output increase control operation is excessively small, the input rotational speed Nt or the gear ratio Gr disadvantageously drops.

Because of the above reason, as shown in FIG. 7, the engine output may be increased to a level that causes the engine rotational speed Ne to be slightly higher than the input shaft rotational speed Nt of the transmission gear mechanism 55. In this way, when the off-going friction element of the higher speed gear stage is disengaged, the input shaft rotational speed Nt or the gear ratio Gr will be slightly increased. Also, even when the off-going friction element of the higher speed gear stage is not sufficiently disengaged, the acceleration of the vehicle in the preliminary output increase control operation is minimized.

At a time point t7, it is detected that the input shaft rotational speed Nt of the transmission gear mechanism 55 is increased by a predetermined amount K or more in the preliminary output increase control operation. At this time point t7, it is determined that the hydraulic pressure of the off-going clutch is reduced and thereby becomes equal to or less than a hydraulic pressure, which corresponds to the nominal transmission torque capacity and which will not cause an acceleration feeling or a shift shock even when the engine output increase control operation is started. Then, the operation is shifted to the main output increase control operation to prepare for the next upcoming gear shifting. Alternatively, at the time point t7, in place of detecting the increase in the input shaft rotational speed Nt, it may be detected that the gear ratio Gr is increased by a predetermined amount K or more. Then, at this time point t7, the main output increase control operation may be performed.

During the main output increase control operation, the engine output (throttle opening degree) is increased based on the target gear ratio and the operational condition (for example, the input shaft rotational speed Nt and the engine coolant temperature) in view of a corresponding main output increase control operation throttle opening degree setting map shown in FIG. 18A or 18B. Also, at the same time, a fuel cut flag (hereinafter referred to as "F/C flag") is turned off to start a fuel injection restart control operation. Therefore, the fuel injection is restarted.

The engine output begins to increase after a certain delay from the time of starting the main output increase control operation (the main throttle opening degree control operation and the fuel injection restart control operation). The delay in the start of the engine output increase may be due to the following reasons. That is, in the case of the throttle opening degree control operation, the delay in the start of the engine output increase is due to a response delay (Ta) in the valve opening movement of the throttle valve 15 and a response delay (Tb) from the time of actually opening the throttle valve 15 to the time of starting the increase in the engine output. In the case of the fuel injection restart control operation, the delay in the start of the engine output increase is due to a response delay (Tc) from the time of restarting the fuel injection to the time of starting the increase in the engine output.

After the start of the main throttle opening degree control operation (the main output increase control operation), a throttle opening degree command value, which is set to produce the input shaft rotational speed Nt that achieves the desired shift time and shift feeling, is outputted and maintained. The throttle opening degree command value is set based on the friction loss of the engine 11, the corresponding parameters and the desired gear shift time period. These parameters may include the gear shift pattern (the change in the gear ratio), the engine coolant temperature and the input shaft rotational speed Nt. Besides these parameters, the throttle opening degree command value may be set further based on the road slope, the degree of deceleration of the vehicle speed to further improve the feeling to the desired level. Furthermore, the throttle opening degree command value is corrected based on an output of the air flow meter 14. The main output increase control operation causes an increase in the input shaft rotational speed Nt of the transmission gear mechanism 55 (the output shaft rotational speed of the torque converter 52).

During the main output increase control operation, a predetermined amount of engine output increase is maintained. Also, at the same time, it is determined whether it is the time to terminate the main output increase control operation to end the actual engine output increase and thereby to end the downshift control operation at the appropriate time (i.e., the time of reaching 100% of the gear shift progress rate SftR). This determination is made based on whether the gear shift progress rate SftR exceeds a predetermined value. This predetermined value is set in view of the response delay, which is a time period from the time of outputting a termination command for terminating the main output increase control operation to the time of actually stopping the engine output increase. This response delay is computed based on the current gear shift progress rate SftR and a rate of increase ΔSftR of the gear shift progress rate SftR per unit time Δt. When it is determined that it is the time for terminating the main output increase control operation (i.e., the time point t8, t9), a termination control operation is performed in the throttle opening degree control operation to reduce the throttle opening degree command value to zero (0) in the throttle opening degree control operation. In the termination control operation, the throttle opening degree command value is reduced to zero (0) at a predetermined rate to maintain the transition reproducibility of the electronic throttle. In the fuel injection restart control operation, the F/C flag is returned to the ON state according to the termination determination to resume the fuel cut once again. However, this is not performed when the fuel cut demand from the engine 11 side no longer exists due to a rapid decrease of the engine rotational speed or the like.

The causes of the response delay in the throttle opening degree control operation at the time of terminating the main output increase control operation may include a response delay (Td) in the full valve closing movement of the throttle valve 15, a response delay (Te) from the time of actually, fully closing the throttle valve 15 to the time of actually stopping the engine output and a time period (Tsd) between the time of the termination determination and the time of reducing the throttle opening degree command value to zero (0). Furthermore, the cause of the response delay in the fuel injection restart control operation includes a response delay (Tf) from the time of resuming the fuel cut to the time of stopping the engine output.

Here, the response delay (Td) in the full valve closing movement of the throttle valve 15 is computed based on the map of the relevant parameters (e.g., the engine coolant temperature, the battery voltage), which are related to the drive response of the motor 17 of the electronic throttle system. In addition, the response delay (Te) from the time of fully closing the throttle valve 15 to the time of stopping the increase in the engine output is computed based on the delay from the time of introducing the intake air, which is reduced through the full closure of the throttle valve 15, into the cylinder to the time of combustion in the cylinder in view of the map of the corresponding parameter (e.g., the engine rotational speed, the throttle opening degree), which is related to the intake air flow rate. The time (Tsd) from the time of determining the termination of the throttle valve opening degree control operation to the time of reducing the throttle opening degree command value to zero (0) is computed based on the throttle opening degree command value/reduction rate. In addition, the response delay (Tf) from the time of restarting the fuel cut to the time of loss of the engine output is set based on a time period from the time of restarting the fuel cut of the cylinder to the time of reaching a combustion stroke in that cylinder (a time period T720° CA, which is required for the crankshaft to rotate 720° CA).

The gear shift control operation of the first embodiment described above is performed according to the following respective routines through the cooperation of the AT-ECU 70 and the engine ECU 25. Each routine will be described hereinafter.

Figure 8:
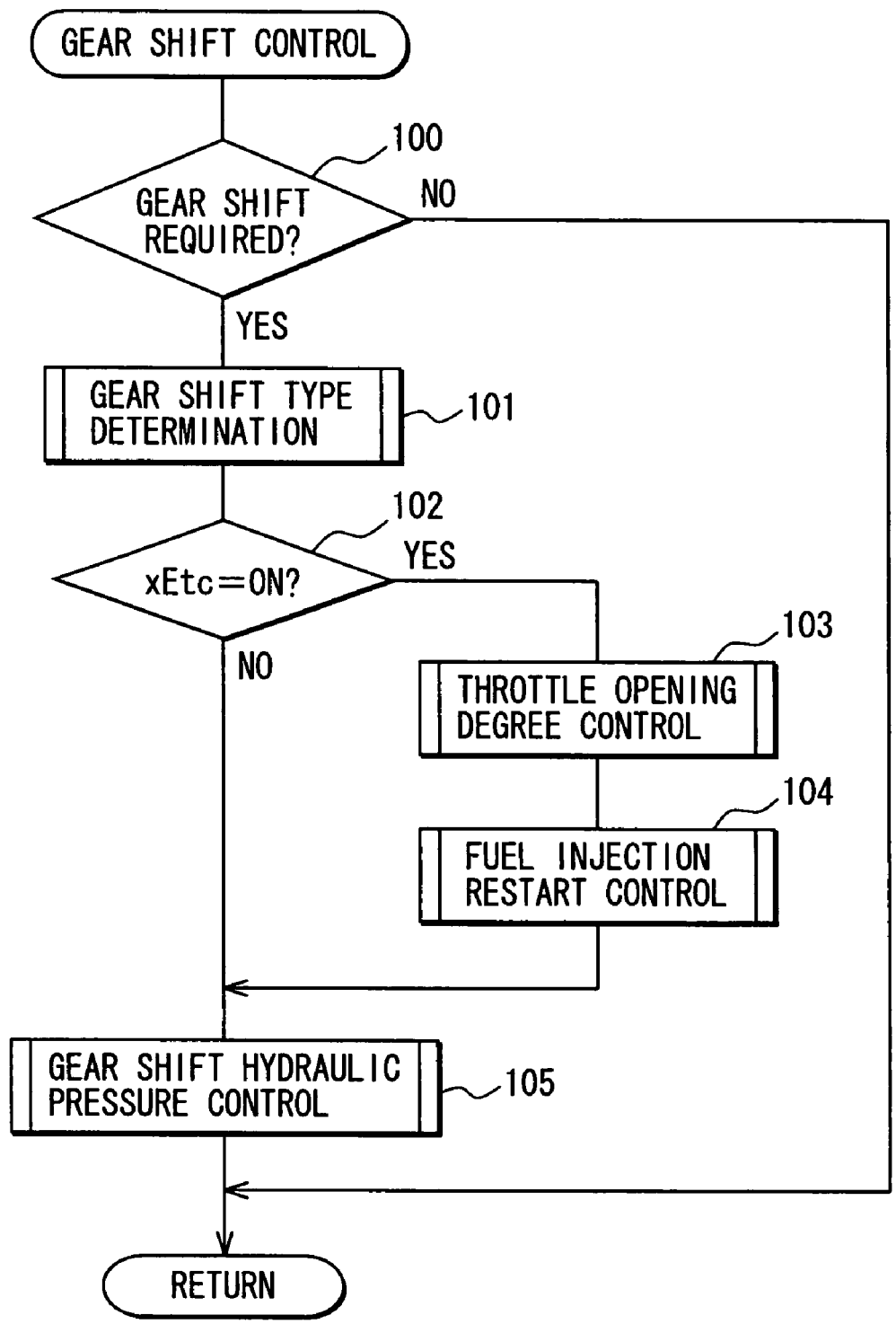
FIG. 8 is a flowchart showing a gear shift control routine according to the first embodiment.

Next, the gear shift control routine will be described with reference to FIG. 8. The gear shift control routine of FIG. 8 is a main routine of the gear shift control operation performed at predetermined time intervals during the engine operating (for example, every 8 to 32 milliseconds). When this routine is activated, first, at step 100, it is determined whether gear shift is required (whether a gear shift command is outputted). When it is determined that the gear shift is not required, this routine is terminated without executing subsequent steps.

In contrast, when it is determined that the gear shift is required at step 100, the operation proceeds to step 101. At step 101, a gear shift type determination routine of FIG. 9, which will be described in detail below, is executed to determine a type of the gear shift, which corresponds to the gear shift command. Thereafter, the operation proceeds to step 102 where it is determined whether an ETC cooperative downshift execution flag xEtc is set to ON. The ON state of the ETC cooperative downshift execution flag xEtc indicates that the condition for executing the ETC cooperative downshift is satisfied. When it is determined that the ETC cooperative downshift execution flag xEtc is set to OFF, the operation proceeds to step 105 where a corresponding gear shift hydraulic pressure control routine (not shown), which corresponds to the type of the requested gear shift, is executed to implement the requested gear stage (gar ratio), which corresponds to the current gear shift command. Then, this routine is terminated.

In contrast, when it is determined that the ETC cooperative downshift execution flag xEtc is set to ON at step 102, it is determined that the ETC cooperative downshift execution condition is satisfied, and the operation proceeds from step 102 to step 103. At step 103, a throttle opening degree control routine of FIG. 13, which will be described later, is executed to perform the throttle opening degree control operation. Then, at step 104, a fuel injection restart control routine of FIG. 20, which will be described later, is executed to perform the fuel injection restart control operation. Thereafter, the operation proceeds to step 105 where a gear shift hydraulic pressure control routine of FIG. 10, which will be described later, is executed to implement the requested gear stage, which is indicated by the current gear shift command. Then, the current routine is terminated.

Figure 9:
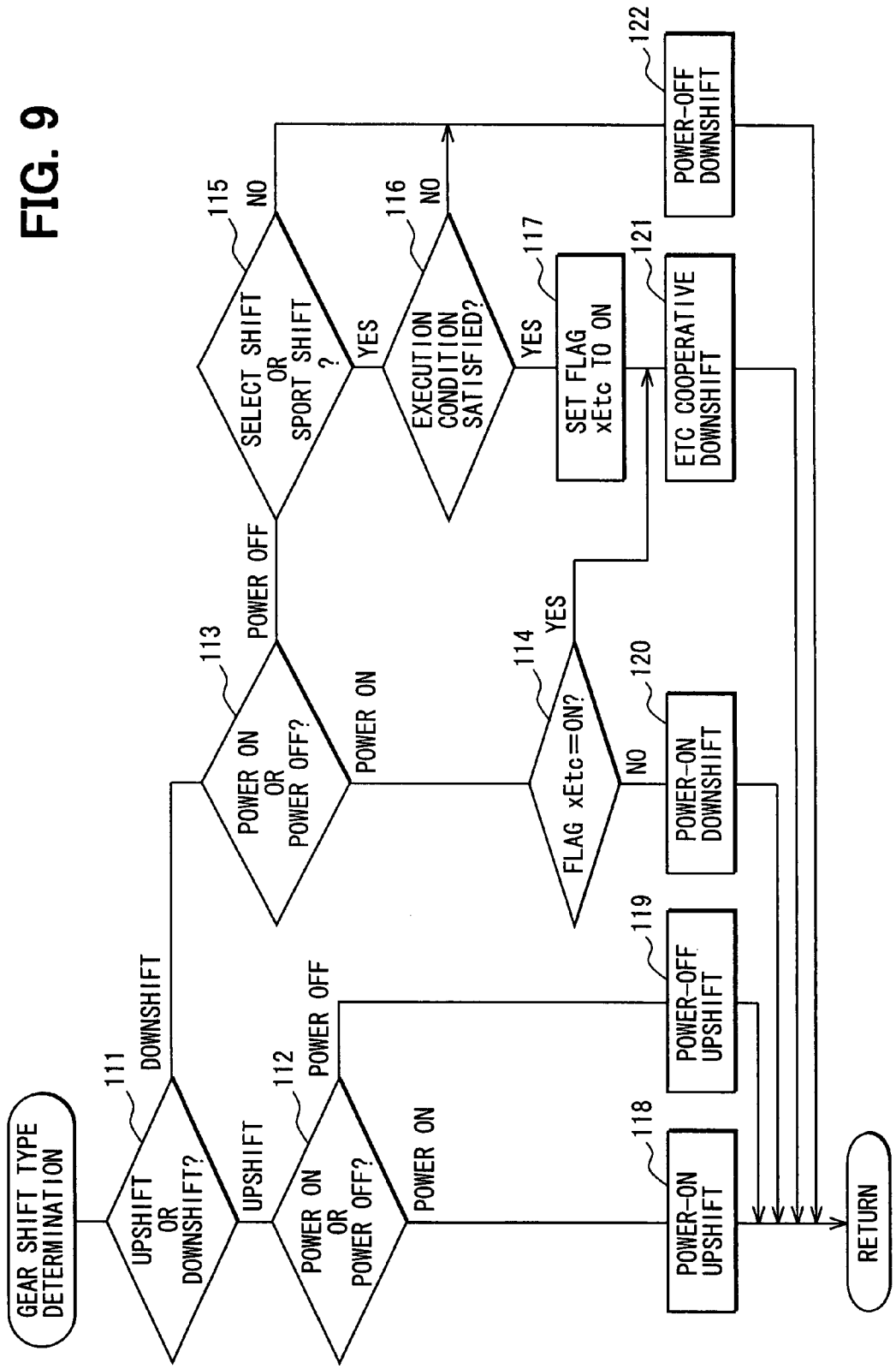
FIG. 9 is a flowchart showing a gear shift type determination routine according to the first embodiment.

Next, the gear shift type determination routine will be described in detail with reference to FIG. 9. The gear shift type determination routine of FIG. 9 is a sub-routine, which is executed at step 101 of the gear shift control routine shown in FIG. 8. When this routine is executed, first, at step 111, it is determined whether the current gear shift command is a gear upshift command or a gear downshift command. When it is determined that the current gear shift command is the gear upshift command, the operation proceeds to step 112. At step 112, it is determined whether a state of a load, which is applied to the automatic transmission 51, is a power-on state (a state where the automatic transmission 51 is driven by the engine 11) or a power-off state (a state where the automatic transmission 51 is driven by the drive wheels). Based on the result of the determination at step 112, it is determined whether the gear shift type, which corresponds to the current gear shift command, is a power-on upshift (step 118) or a power-off upshift (step 119). Specifically, when it is determined that the state of the load, which is applied to the automatic transmission 51, is the power-on state at step 112, the operation proceeds to step 118 where it is determined that the gear shift type is the power-on upshift. In contrast, when it is determined that the state of the load, which is applied to the automatic transmission 51, is the power-off state at step 112, the operation proceeds to step 119 where it is determined that the gear shift type is the power-off upshift.

Returning to step 111, when it is determined that the current gear shift command is the gear downshift command, the operation proceeds to step 113. At step 113, it is determined whether a state of a load, which is applied to the automatic transmission 51, is the power-on state or the power-off state. When it is determined that the state of the load, which is applied to the automatic transmission 51, is the power-off state at step 113, the operation proceeds to step 115. At step 115, it is determined whether the gear downshift command in the power-off state is due to a driver's demand for deceleration. Here, when the gear downshift command in the power-off state is due to one of select shift and sport shift, it is determined that the gear downshift command in the power-off state is due to the driver's demand for deceleration. The select shift is made through operation of the shift lever 16. The sport shift is implemented through operation of a switch, which is provided to the steering wheel, in the manual mode or through operation of the shift lever 16. Here, it should be understood that the driver's demand for deceleration is a demand of the driver for deceleration received through the shift lever 16 or any switch or device (not limited to the switch provided to the steering wheel), which is other than the accelerator pedal. When it is determined that the gear downshift command in the power-off state is due to the driver's demand for deceleration at step 115, the operation proceeds to step 116. At step 116, it is determined whether the ETC cooperative downshift execution condition is satisfied. This may be determined by determining whether a hydraulic fluid temperature (an oil temperature) of the hydraulic fluid is in a good temperature range, in which a relatively high reproducibility of the corresponding hydraulic pressure response for the hydraulic pressure command value is achievable to perform the corresponding control operation. When the answer to this inquiry is YES, i.e., when it is determined that the ETC cooperative downshift execution condition is satisfied at step 116, the operation proceeds to step 117. At step 117, the ETC cooperative downshift execution flag xEtc is set to ON, and the operation proceeds to step 121. At step 121, it is determined that the current gear shift type is the ETC cooperative downshift control operation.

Furthermore, when it is determined that gear downshift command in the power-off state is not due to the driver's demand for deceleration at step 115, the operation proceeds to step 122. Also, when it is determined that the ETC cooperative downshift execution condition is not satisfied at step 116, the operation proceeds to step 122. At step 122, it is determined that the current gear shift type is the power-off downshift.

Returning to step 113, when it is determined that the load state in the automatic transmission 51 is the power-on state, the operation proceeds to step 114 where it is determined whether the ETC cooperative downshift execution flag xEtc is set to ON. This is done to determine whether the power-on state is a power-on state, which is caused by the ETC cooperative downshift control operation (the engine output increase control operation), or a power-on state, which is caused by depression of the accelerator pedal 26 by the driver. When it is determined that the ETC cooperative downshift execution flag xEtc is set to ON at step 114, the operation proceeds to step 121 where it is determined that the current gear shift type is the ETC cooperative downshift. In contrast, when it is determined that the ETC cooperative downshift execution flag xEtc is set to OFF at step 114, the operation proceeds to step 120 where it is determined that the current gear shift type is the power-on downshift.

Figure 10:
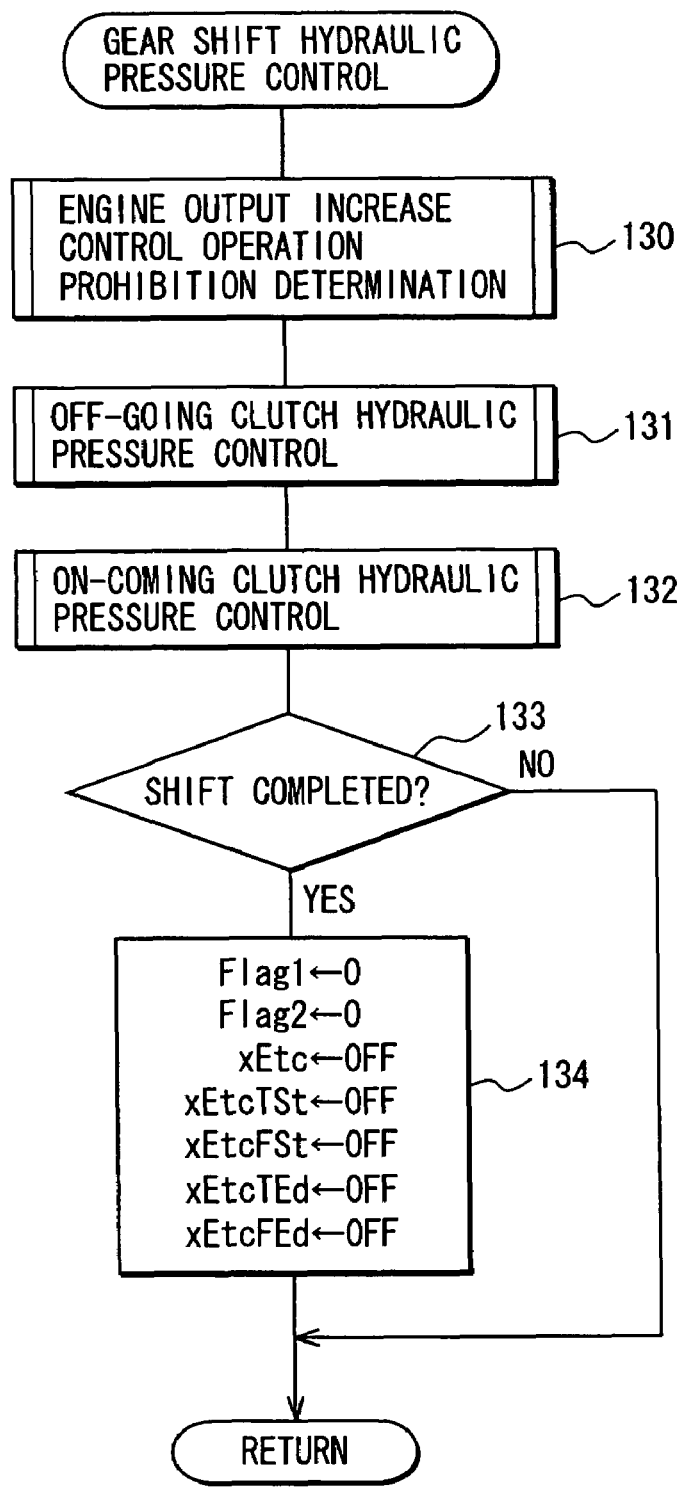
FIG. 10 is a flowchart showing a gear shift hydraulic pressure control routine according to the first embodiment.

Next, the gear shift hydraulic pressure control routine will be described in detail with reference to FIG. 10. The gear shift hydraulic pressure control routine of FIG. 10 is performed in the case where the gear shift type is the ETC cooperative downshift control operation. This routine serves as a downshift control means. When this routine is executed, first, at step 130, an engine output increase control operation prohibition determination routine of FIG. 19, which will be described later, is executed to determine whether the engine output increase control operation is prohibited. Thereafter, the operation proceeds to step 131 where an off-going clutch hydraulic pressure control routine of FIG. 11, which will be described later, is executed to control the hydraulic pressure of the off-going clutch. Next, at step 132, an on-coming clutch hydraulic pressure control routine of FIG. 12, which will be described later, is executed to control the hydraulic pressure of the on-coming clutch.

Thereafter, the operation proceeds to step 133 where it is determined whether the shift is completed. This is determined by determining whether control stage flags Flag1, Flag2, which will be described later, are 4 and 5,respectively (Flag1=4 and Flag2=5). When it is determined that the shift is completed at step 133, the operation proceeds to step 134 where control flags Flag1, Flag 2 are reset to zero (0), and all of other flags xEtc, xEtcTSt, xEtcFSt, xEtcTEd and xEtcFEd are reset to "OFF". Then, the current routine is terminated.

Figure 11:
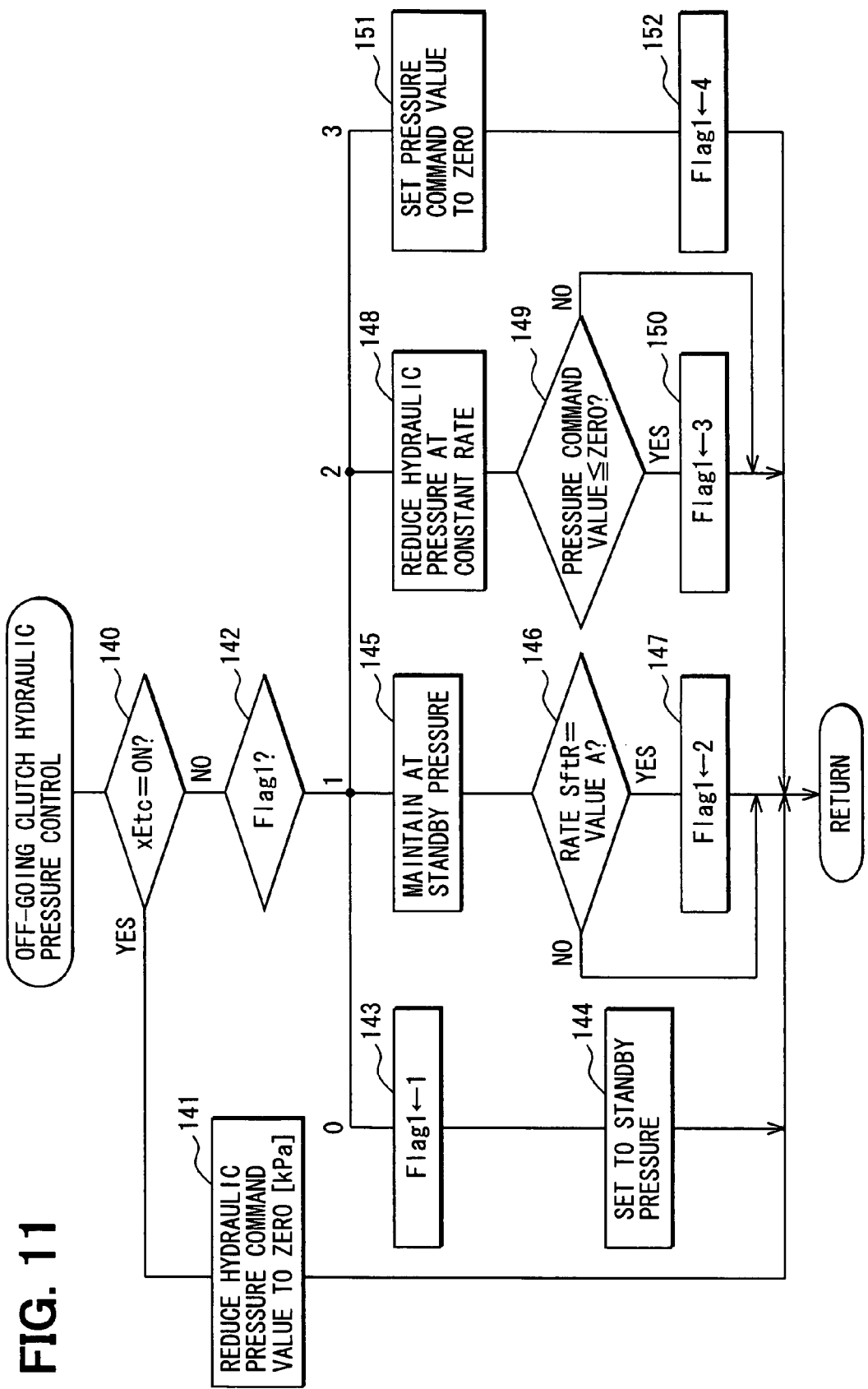
FIG. 11 is a flowchart showing an off-going clutch hydraulic control routine according to the first embodiment.

Next, the off-going clutch hydraulic pressure control routine will be described in detail with reference to FIG. 11. The off-going clutch hydraulic pressure control routine of FIG. 11 is executed at step 131 of the gear shift hydraulic pressure control routine of FIG. 10. When the off-going clutch hydraulic pressure control routine is executed, first, at step 140, it is determined whether the ETC cooperative downshift execution flag xEtc is set to ON to determine whether the current gear shift type is the ETC cooperative downshift. When it is determined that the ETC cooperative downshift execution flag xEtc is set to ON at step 140, the operation proceeds to step 141. At step 141, the hydraulic pressure command value of the off-going clutch is quickly reduced to "zero (0)" (kPa), which is the minimum hydraulic pressure (see FIG. 7). This step 141 also serves as the downshift control means.

In contrast, when it is determined that the ETC cooperative downshift execution flag xEtc is set to OFF at step 140, the operation proceeds to step 142. At step 142, it is determined whether the control stage flag Flag1 is set to one of 0 to 3 to determine the current stage of the hydraulic pressure control operation of the off-going clutch. This control stage flag Flag1 is a flag, which is incremented by one every time the hydraulic pressure control operation of the off-going clutch is advanced from one stage to the next stage. An initial value of the control stage flag Flag1 is zero (0), and a maximum value of the control stage flag Flag1 is 4. Thus, the hydraulic pressure control operation of the off-going clutch is a four-stage sequence control operation.

The control stage flag Flag1 is set to the initial value (0) at the time point t0, at which the hydraulic pressure control operation of the off-going clutch starts. Therefore, the operation proceeds to step 143 where the control stage flag Flag1 is set to "1", and the operation proceeds to step 144. At step 144, the hydraulic pressure command value of the off-going clutch is set to a standby hydraulic pressure PtDr to reduce the hydraulic pressure, which is supplied to the off-going clutch, to the standby hydraulic pressure PtDr (control operation at the first stage).

At the time of activating this routine next time, the control stage flag Flag1 has been already set to 1 (i.e., Flag1=1). Thus, the operation proceeds from step 142 to step 145. At step 145, the hydraulic pressure of the off-going clutch is maintained at the standby hydraulic pressure PtDr. Then, at step 146, it is determined whether the gear shift progress rate SftR has reached a predetermined value A, which is close to 100%. When it is determined that the gear shift progress rate SftR has not reached the predetermined value A at step 146, the current routine is terminated. Thereafter, when it is determined that the gear shift progress rate SftR has reached the predetermined value A at step 146, the operation proceeds to step 147. At step 147, the control stage flag Flag1 is set to "2". Then, the control operation of the second stage is terminated, and then the operation is shifted to the control operation of the third stage.

In the control operation of the third stage, first, at step 148, the hydraulic pressure command value of the off-going clutch is reduced at a constant rate. Next, at step 149, it is determined whether the hydraulic pressure command value of the off-going clutch is reduced and thereby becomes equal to or less than zero (0). The control operation (the hydraulic pressure decrease control operation) of the third stage is continued until the hydraulic pressure command value becomes equal to or less than zero (0). Thereafter, when the hydraulic pressure command value becomes equal to or less than zero (0), the operation proceeds to step 150. At step 150, the control stage flag Flag1 is set to "3". Then, the control operation of the third stage is terminated, and the operation is shifted to the control operation of the fourth stage.

In the control operation of the fourth stage, first, at step 151, the hydraulic pressure command value of the off-going clutch is set to "0", and the fully disengaged state of the off-going clutch is maintained. Next, at step 152, the control stage flag Flag1 is set to "4", and the off-going clutch hydraulic pressure control operation is terminated.

Figure 12:
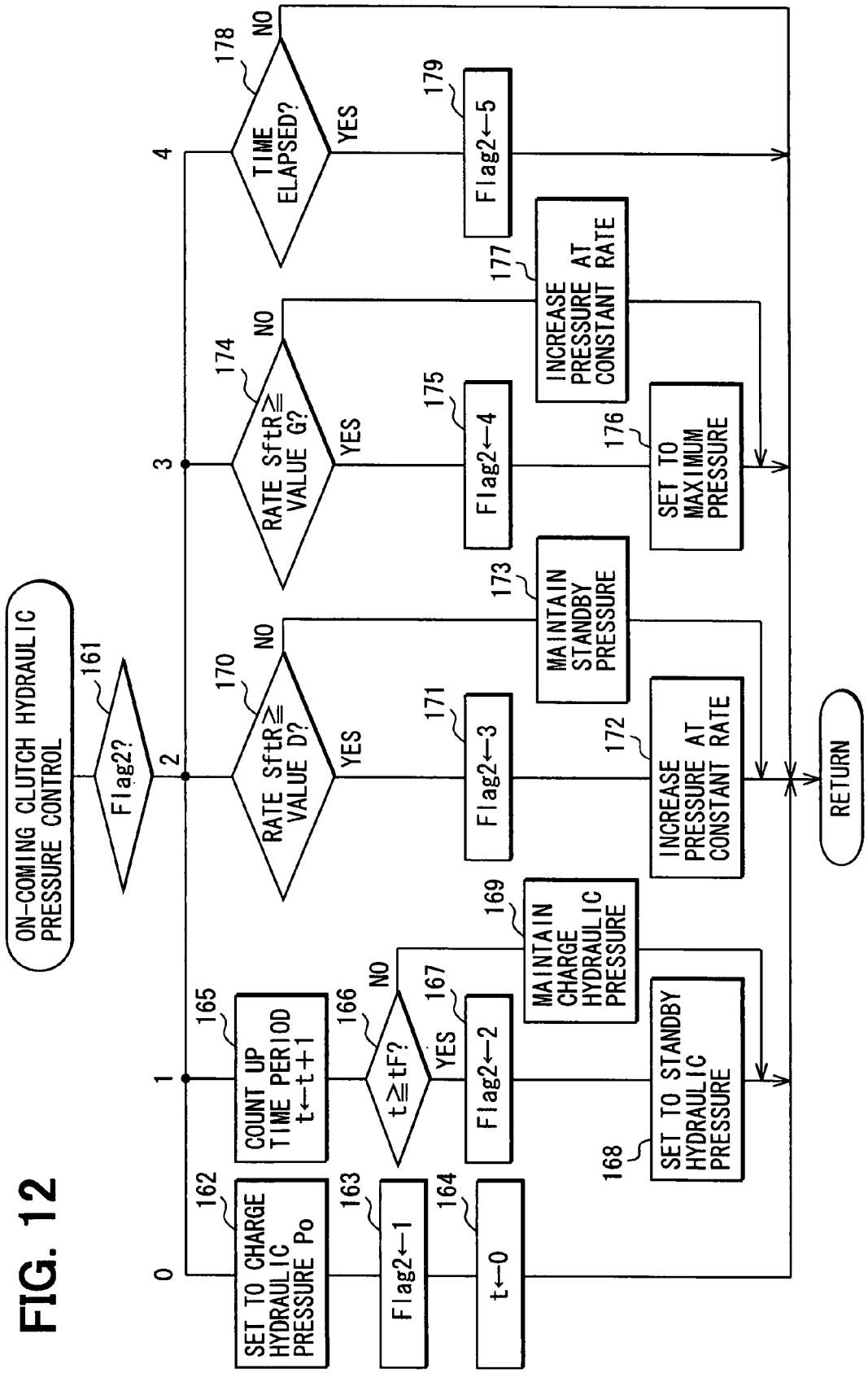
FIG. 12 is a flowchart showing an on-coming clutch hydraulic control routine according to the first embodiment.

Next, the on-coming clutch hydraulic pressure control routine will be described in detail with reference to FIG. 12. The on-coming clutch hydraulic pressure control routine of FIG. 12 is a sub-routine, which is executed at step 132 of the gear shift hydraulic pressure control routine of FIG. 10. When the on-coming clutch hydraulic pressure control routine is executed, first, at step 161, it is determined whether the value of the control stage flag Flag2 is one of zero (0) to 4 to determine the current stage of the on-coming clutch hydraulic pressure control operation. This control stage flag Flag2 is a flag, which is incremented by one every time the hydraulic pressure control operation of the on-coming clutch is advanced from one stage to the next stage. An initial value of the control stage flag Flag2 is zero (0), and a maximum value of the control stage flag Flag2 is 5. Thus, the hydraulic pressure control operation of the on-coming clutch is a five-stage sequence control operation.

The control stage flag Flag2 is set to the initial value (0) at the time point to, at which the hydraulic pressure control operation of the on-coming clutch starts. Thus, the operation proceeds to step 162. At step 162, the hydraulic pressure command value of the on-coming clutch is set to a predetermined charge hydraulic pressure Po to place the on-coming clutch to the state, which is immediately before the generation of the engaging force. Then, the charge control operation for charging the hydraulic fluid to the on-coming clutch is executed. Thereafter, at step 163, the control stage flag Flag2 is set to "1", and the operation proceeds to step 164. At step 164, a charge control operation timer t, which counts, i.e., measures a charge control operation time period, is reset to "zero (0)", and the current routine is terminated.

At the time of activating this routine next time, the control stage flag Flag2 is already set to 1 (i.e., Flag2=1). Thus, the operation proceeds from step 161 to step 165. At step 165, the charge control operation timer t is counted up to count up the total charge control operation time period. Then, at step 166, it is determined whether the current value of the charge control operation timer t becomes equal to longer than a predetermined time period tF. When it is determined that the current value of the charge control operation timer t is less than the predetermined time period tF at step 166, the hydraulic pressure command value of the on-coming clutch is maintained to the charge hydraulic pressure Po until the charge control operation time period reaches the predetermined time period tF to continue the charge control operation (step 169).

Here, the predetermined time period tF is a time period, which is required to place the on-coming clutch in the state, which is immediately before the generation of the engaging force by the on-coming clutch through the charge control operation. Furthermore, the predetermined time period tF is determined in advance through experiments or simulations.

Thereafter, when the charge control operation time period reaches the predetermined time period tF, i.e., when the on-coming clutch is placed in the state, which is immediately before the generation of the engaging force through the charge control operation (i.e., YES at step 166), the operation proceeds to step 167. At step 167, the control stage flag Flag2 is set to "2". Then, at step 168, the hydraulic pressure command value of the on-coming clutch is reduced to the standby hydraulic pressure PtAp, and the charge control operation is terminated. Therefore, the standby hydraulic pressure PtAp maintains the on-coming clutch in the state, which is immediately before the generation of the engaging force by the on-coming clutch.

When the hydraulic pressure of the on-coming clutch is controlled to the standby hydraulic pressure PtAp, the control stage flag Flag2 is set to "2". In such a case, the operation proceeds from step 161 to step 170. At step 170, it is determined whether the gear shift progress rate SftR has reached a predetermined value D, i.e., has become equal to or greater than the predetermined value D (see FIG. 7). When it is determined that the gear shift progress rate SftR has not reached the predetermined value D at step 170, the hydraulic pressure command value of the on-coming clutch is maintained to the standby hydraulic pressure PtAp until the gear shift progress rate SftR reaches the predetermined value D (step 173).

Thereafter, when the gear shift progress rate SftR reaches the predetermined value D, the operation proceeds to step 171. At step 171, the control stage flag Flag2 is set to "3". Then, at step 172, the operation is shifted to the operation that increases the hydraulic pressure command value of the on-coming clutch at a constant rate.

Thereafter, when the present routine is started once again, the control stage flag Flag2 has been already set to "3". In such a case, the operation proceeds from step 161 to step 174. At step 174, it is determined whether the gear shift progress rate SftR is equal to or greater than a predetermined value G, which is close to 100%. When it is determined that the gear shift progress rate SftR is less than the predetermined value G at step 174, the control operation, which increases the hydraulic pressure command value of the on-coming clutch at the constant rate, is maintained until the gear shift progress rate SftR has reached the predetermined value G (step 177).

Then, when it is determined that the gear shift progress rate SftR has reached the predetermined value G at step 174, the operation proceeds to step 175. At step 175, the control stage flag Flag2 is set to "4". Then, at step 176, the hydraulic pressure command value of the on-coming clutch is set to the maximum pressure, and the hydraulic pressure of the on-coming clutch is increased to the maximum pressure. Thereby, the engaging force of the on-coming clutch is increased at the appropriate timing, at which the input shaft rotational speed Nt is increased to the corresponding rotational speed that corresponds to the rotational speed at the lower speed gear stage, to which the downshift is targeted. Thereby the downshift is completed.

Thereafter, when the present routine is started next time, the control stage flag Flag2 has been already set to "4". Thus, the operation proceeds from step 161 to step 178. At step 178, it is determined whether a predetermined time period has elapsed since the time of setting the control stage flag Flag2 to "4", i.e., whether a predetermined time period has elapsed since the time, at which the gear shift progress rate SftR reaches the predetermined value G. When it is determined that the predetermined time period has elapsed at step 178, the operation proceeds to step 179. At step 179, the control stage flag Flag2 is set to "5", and the on-coming clutch hydraulic pressure control operation is terminated.

Figure 13:
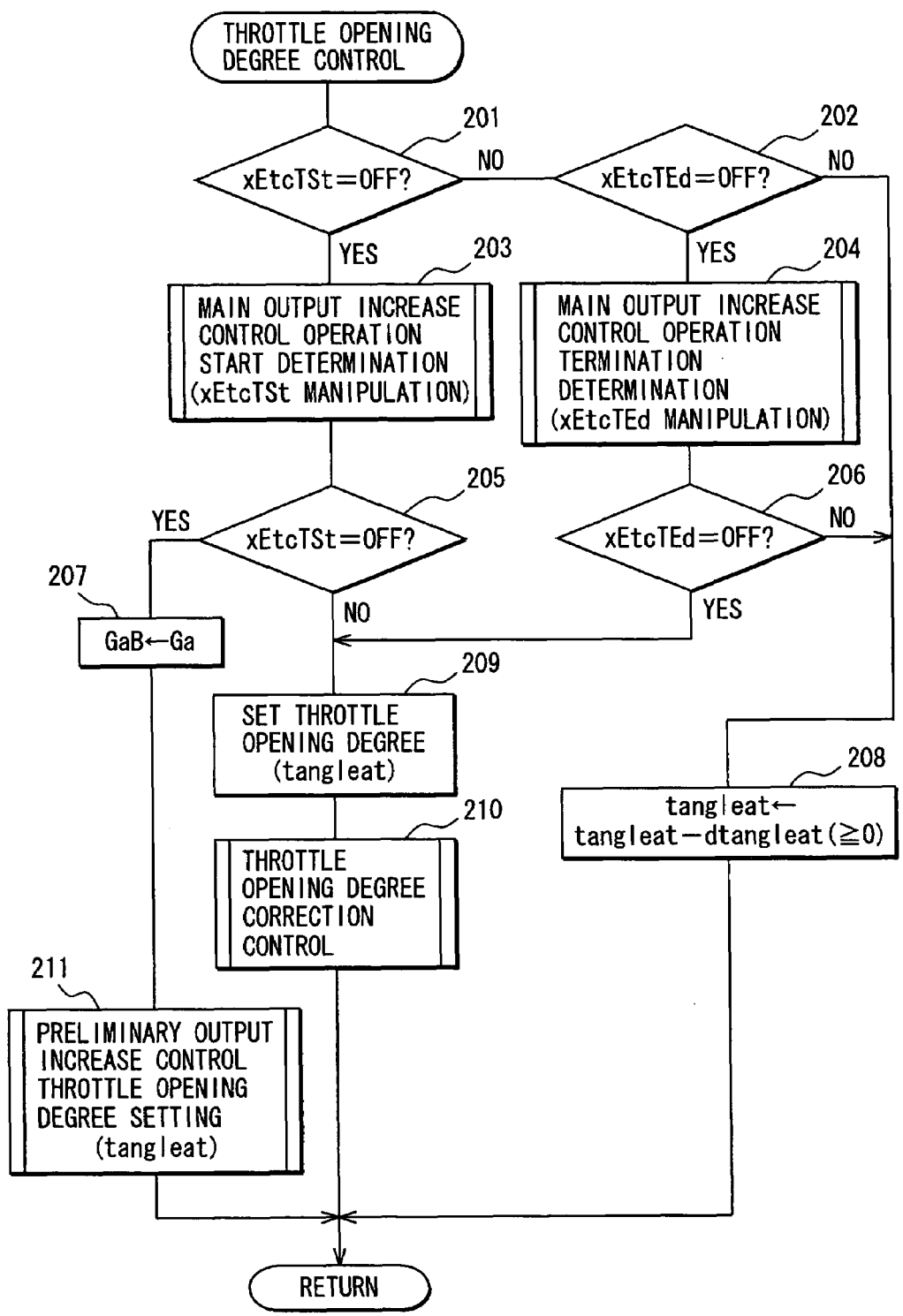
FIG. 13 is a flowchart showing a throttle opening degree control routine according to the first embodiment.

Next, the throttle opening degree control routine will be described in detail with reference to FIG. 13. The throttle opening degree control routine of FIG. 13 is a sub-routine, which is executed at step 103 in the gear shift control routine of FIG. 8. The throttle opening degree control routine serves as an engine output increase control means.

Figure 14A:
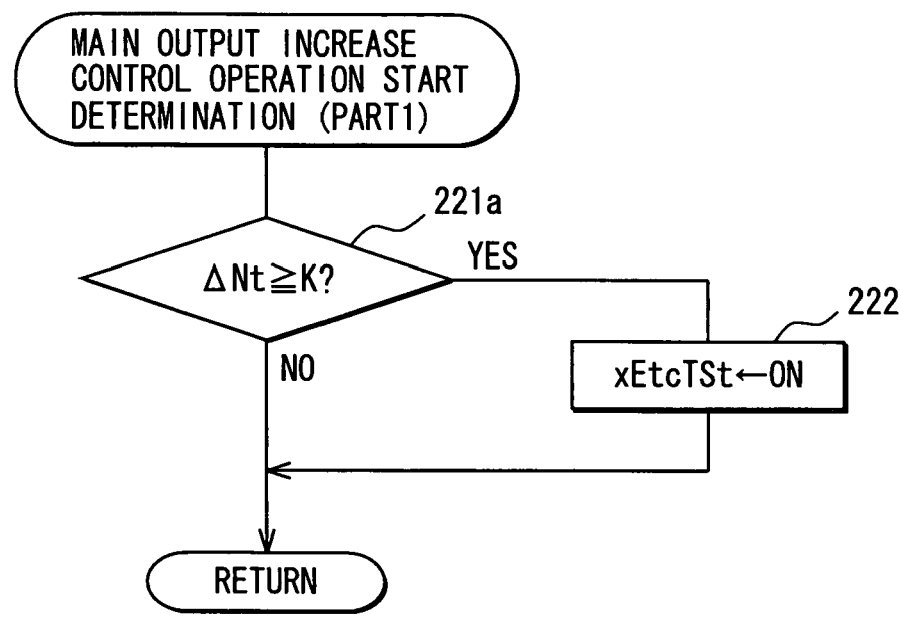
FIG. 14A is a flowchart showing a main output increase control operation start determination routine (part 1) according to the first embodiment.
Figure 14B:
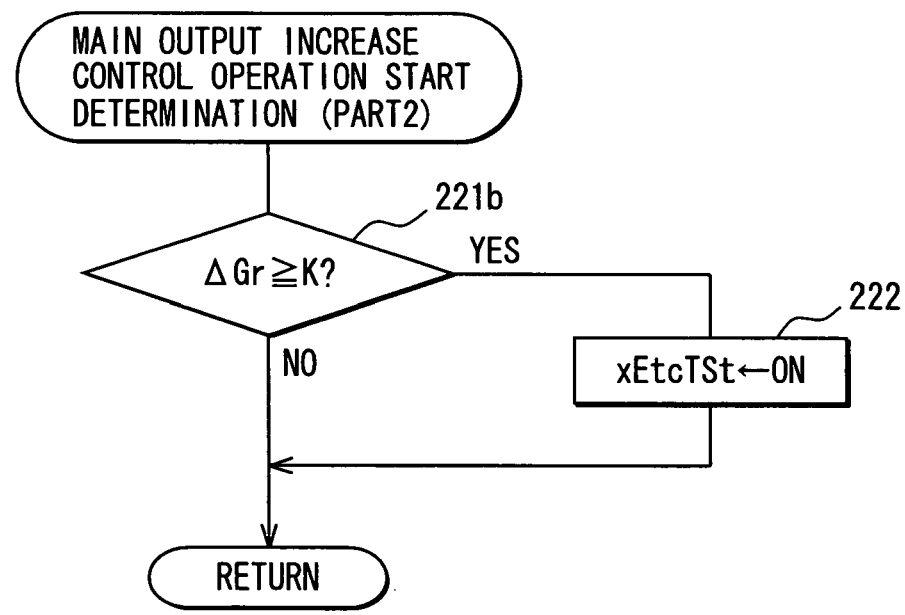
FIG. 14B is a flowchart showing a main output increase control operation start determination routine (part 2) according to the first embodiment.

When this throttle opening degree control routine is started, first, it is determined whether a main output increase control operation start flag xEtcTSt is OFF at step 201. The OFF state of the main output increase control operation start flag xEtcTSt indicates that it is before the execution of the main output increase control operation. When it is determined that the main output increase control operation start flag xEtcTSt is OFF at step 201, the operation proceeds to step 203. At step 203, a main output increase control operation start determination routine, which will be described with reference to FIG. 14A or 14B, is executed to determine whether it is the time for starting the main output increase control operation. Based on the result of this determination, the main output increase control operation start flag xEtcTSt is set or reset.

Thereafter, the operation proceeds to step 205 where it is determined whether the main output increase control operation start flag xEtcTSt is still OFF. When it is determined that the main output increase control operation start flag xEtcTSt is still OFF at step 205, the operation proceeds to step 207. At step 207, a stored value GaB of the intake air quantity is renewed with a current measurement value Ga of the air flow meter 14. Then, at step 211, a throttle opening degree command value tangleat (the throttle opening degree) of the preliminary output increase control operation is set based on the engine coolant temperature and the input shaft rotational speed Nt in view of the preliminary output increase control operation throttle opening degree setting map of FIG. 17. Then, the present routine is terminated.

The preliminary output increase control operation throttle opening degree setting map of FIG. 17 is set as follows. That is, when the engine coolant temperature is decreased, the throttle opening degree command value tangleat is increased. Also, when the input shaft rotational speed Nt is increased, the throttle opening degree command value tangleat is increased. This preliminary output increase control operation throttle opening degree setting map may be set for each corresponding gear shift type.

In contrast, when it is determined that the main output increase control operation start flag xEtcTSt is set to ON at step 205, the operation proceeds to step 209. At step 209, the throttle opening degree command value tangleat (the throttle opening degree) of the main output increase control operation is set based on the gear shift type, the engine coolant temperature and the input shaft rotational speed Nt in view of the corresponding main output increase control operation throttle opening degree setting map of FIG. 18A or 18B. Thereafter, the operation proceeds to step 210 where a throttle opening degree correction control routine of FIG. 16, which will be described later, is executed. Then, the present routine is terminated.

Returning to step 201, when it is determined that the main output increase control operation start flag xEtcTSt is ON (indicating that it is in the middle of the main output increase control operation), the operation proceeds to step 202. At step 202, it is determined whether a main output increase control operation termination flag xEtcTEd is OFF (indicating that it is before the termination of the main output increase control operation). When it is determined that the main output increase control operation termination flag xEtcTEd is OFF at step 202, the operation proceeds to step 204. At step 204, a main output increase control operation termination determination routine of FIG. 15, which will be described later, is executed to determine whether it is the time for terminating the main output increase control operation. Based on the result of this determination at step 204, the main output increase control operation termination flag xEtcTEd is set or reset.

Thereafter, the operation proceeds to step 206. At step 206, it is determined whether the main output increase control operation termination flag xEtcTEd is still OFF. When it is determined that the main output increase control operation termination flag xEtcTEd is still OFF, the operation proceeds to steps 209, 210 described above to maintain the main output increase control operation.

In contrast, when it is determined that the main output increase control operation termination flag xEtcTEd is ON at step 206, the operation proceeds to step 208. At step 208, a termination control operation is executed. In the termination control operation, the throttle opening degree command value tangleat is corrected by decreasing the throttle opening degree command value tangleat by a predetermined amount dtangleat each time, so that the throttle opening degree command value tangleat is reduced to zero (0) at a predetermined rate.

Next, the main output increase control operation start determination routine (part 1) will be described in detail with reference to FIG. 14A. The main output increase control operation start determination routine of FIG. 14A is a subroutine, which is executed at step 203 of the throttle opening degree control routine of FIG. 13 to determine the time of starting the main output increase control operation based upon an increase amount ΔNt of the input shaft rotational speed Nt since the time of starting the ETC cooperative downshift control operation.

When this main output increase control operation start determination routine is executed, first, at step 221a, it is determined whether the increase amount ΔNt of the input shaft rotational speed Nt, which has been measured since the time of starting the ETC cooperative downshift control operation, becomes equal to the predetermined amount K or more. When it is determined that the increase amount ΔNt of the input shaft rotational speed Nt, which has been measured since the time of starting the ETC cooperative downshift control operation, has not become equal the predetermined amount K ore more at step 221a, it is then determined that the time for starting the main output increase control operation has not been reached. Thereby, the present routine is terminated.

Thereafter, when it is determined that the increase amount ΔNt of the input shaft rotational speed Nt, which has been measured since the time of starting the ETC cooperative downshift control operation, becomes the predetermined amount K or more at step 221a, it is then determined that the time for starting the main output increase control operation has reached. Thus, the operation proceeds from step 221a to step 222. At step 222, the main output increase control operation start flag xEtcTSt is set to ON, and the present routine is terminated.

Next, the main output increase control operation start determination routine (part 2) will be described in detail with reference to FIG. 14B. At step 203 of the throttle opening degree control routine of FIG. 13, the main output increase control operation start determination routine of FIG. 14B may be executed instead of the main output increase control operation start determination routine of FIG. 14A. In this routine of FIG. 14B, the time for starting the main output increase control operation is determined as follows based on an increase amount ΔGr of the gear ratio Gr, which has been measured since the time of starting the ETC cooperative downshift control operation.

When this routine of FIG. 14B is executed, first, at step 221b, it is determined whether the increase amount ΔGr of the gear ratio Gr, which has been measured since the time of starting the ETC cooperative downshift control operation, becomes the predetermined amount K or more. When it is determined that the increase amount ΔGr of the gear ratio Gr, which has been measured since the time of starting the ETC cooperative downshift control operation, has not become the predetermined amount K or more at step 221*b*, it is then determined that the time for starting the main output increase control operation has not reached. Thus, the present routine is terminated.

Thereafter, when it is determined that the increase amount ΔGr of the gear ratio Gr, which has been measured since the time of starting the ETC cooperative downshift control operation, becomes the predetermined amount K or more at step 221*b*, it is then determined that the time for starting the main output increase control operation has reached. Thus, the operation proceeds from step 221*b* to step 222. At step 222, the main output increase control operation start flag xEtcTSt is set to ON, and the present routine is terminated.

Figure 15:
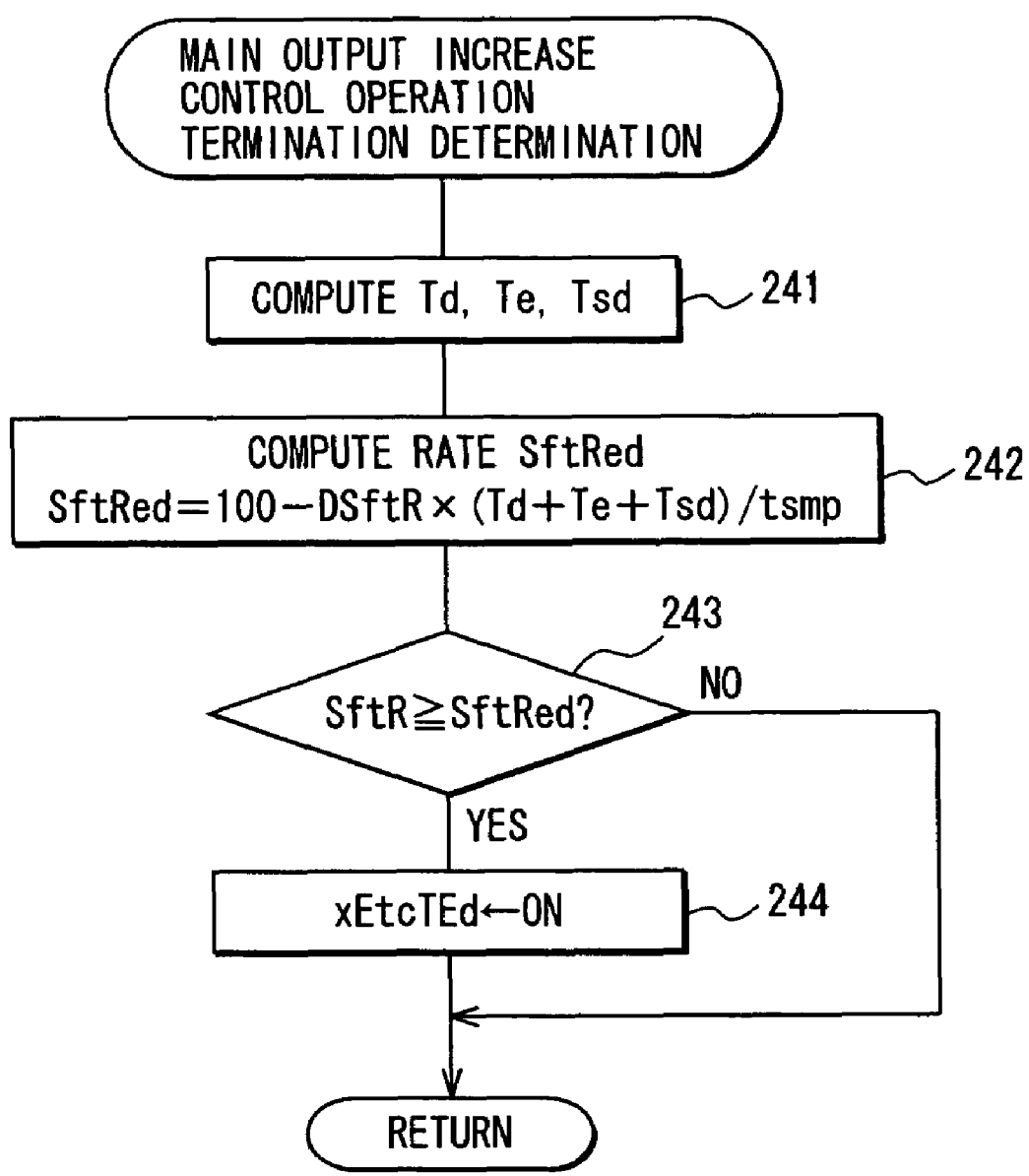
FIG. 15 is a flowchart showing a main output increase control operation termination determination routine according to the first embodiment.

Next, the main output increase control operation termination determination routine will be described in detail with reference to FIG. 15. The main output increase control operation termination determination routine of FIG. 15 is a sub-routine, which is executed at step 204 of the throttle opening degree control routine of FIG. 13. When this routine of FIG. 15 is executed, first, at step 241, a response delay (Td) in a full closing movement of the throttle valve 15, a response delay (Te) from the time of actually, fully closing the throttle valve to the time of actually stopping the engine output increase, and a time period (Tsd) from the time of making the termination determination to the time of reducing the throttle opening degree command value to zero (0) are computed. The response delay (Td) in the full closing movement of the throttle valve 15 is computed based on the map of the relevant parameters (e.g., the engine coolant temperature, the battery voltage), which are relevant to the drive response of the motor 17 of the electronic throttle system. The response delay (Te) from the time of actually, fully closing the throttle valve to the time of actually stopping the engine output increase is computed based on a delay from the time of taking the intake air, which is reduced due to the full closing movement of the throttle valve 15, into the cylinder to the time of making the combustion in the cylinder further in view of the map of the relevant parameters (e.g., the engine rotational speed, the throttle opening degree), which are relevant to the intake air flow rate. The time period (Tsd) from the time of making the termination determination to the time of reducing the throttle opening degree command value to zero (0) is computed based on the throttle opening degree command value and/or reducing rate.

Thereafter, the operation proceeds to step 242. At step 242, the gear shift progress rate SftRed at the end of the main output increase control operation (at the time of starting the termination control operation) is computed according to the following equation.

$$SftRed=100-DSftR\times(Td+Te+Tsd)/tsmp$$

In the above equation, DSftR is the change amount in the gear shift progress rate SftRed per computation cycle of the gear shift progress rate SftRed (i.e., the change amount obtained by subtracting the current gear shift progress rate SftRed from the previous gear shift progress rate SftRed). Furthermore, in the above equation, tsmp is the computation cycle of the change amount DSftR.

Thereafter, the operation proceeds to step 243. At step 243, it is determined whether the current gear shift progress rate SftR becomes equal to or greater than the computed gear shift progress rate SftRed. When it is determined that the current gear shift progress rate SftR has not become equal to or greater than the computed gear shift progress rate SftRed at step 243, the present routine is terminated. Thereafter, when it is determined that the current gear shift progress rate SftR becomes equal to or greater than the computed gear shift progress rate SftRed at step 243, the operation proceeds to step 244. At step 244, the main output increase control operation termination flag xEtcTEd is set to ON.

Next, the throttle opening degree correction control routine will be described in detail with reference to FIG. 16. The throttle opening degree correction control routine of FIG. 16 is a sub-routine, which is executed at step 210 of the throttle opening degree control routine of FIG. 13. When this routine of FIG. 16 is executed, first, at step 251, it is determined whether the execution condition for executing the throttle opening degree correction control operation is satisfied. This execution condition may be satisfied, for example, when an elapsed time period from the time of outputting the throttle opening command in the main output increase control operation is equal to or greater than a time period, which corresponds to the response delay. When it is determined that the elapsed time period from the time of outputting the throttle opening command in the main output increase control operation is less than the predetermined time period, which corresponds to the response delay, it may be determined that the execution condition for executing the throttle opening degree correction control operation is not satisfied at step 251. Thus, the present routine is terminated. Thereafter, when it is determined that the elapsed time period from the time of outputting the throttle opening command in the main output increase control operation is equal to or greater than the predetermined time period, which corresponds to the response delay, it may be determined that the execution condition for executing the throttle opening degree correction control operation is satisfied at step 251. Then, the operation proceeds to step 252 where the throttle opening degree command value tangleat (throttle opening degree) is corrected according to the following equation.

$$tangleat=tangleat\times DGaT/(Ga-GaB)$$

In this equation, DGaT is a target increase amount value of the intake air quantity Ga in the main output increase control operation and is set in accordance with the throttle opening degree command value tangleat in view of a corresponding table. GaB is an intake air quantity, which is stored at step 207 of the throttle opening degree control routine of FIG. 13 and is measured immediately before starting of the main output increase control operation. The throttle opening degree command value tangleat (throttle opening degree) is corrected through the above equation, so that the manufacturing variations of the system, variations due to aging and variations due to operational conditions (e.g., the atmospheric pressure, the an intake air temperature) can be corrected accordingly.

Figure 19:
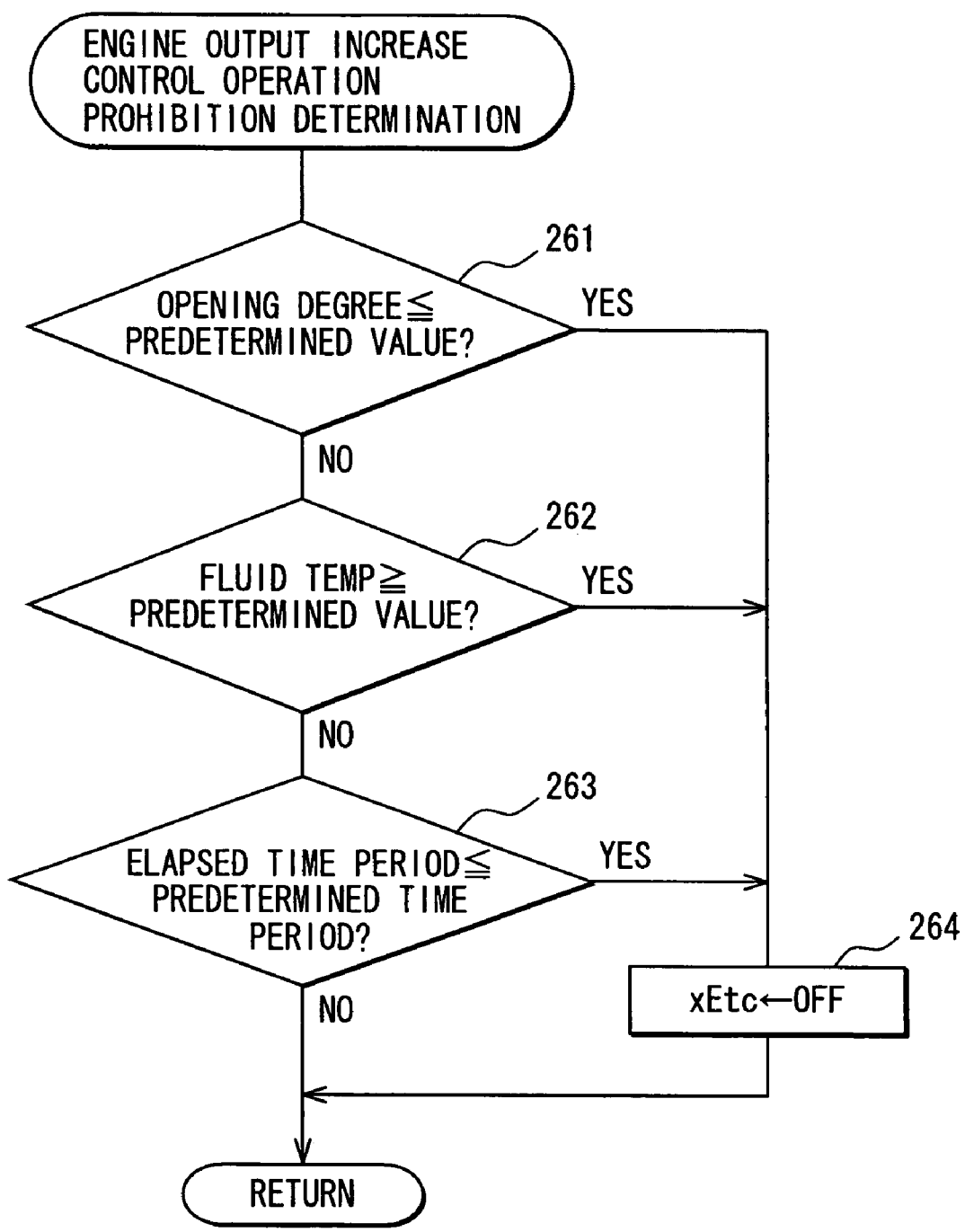
FIG. 19 is a flowchart showing an engine output increase control operation prohibition determination routine according to the first embodiment.

Next, the engine output increase control operation prohibition determination routine will be described in detail with reference to FIG. 19. The engine output increase control operation prohibition determination routine of FIG. 19 is a sub-routine, which is executed at step 130 of the gear shift hydraulic pressure control routine of FIG. 10. When this routine is executed, first, at step 261, it is determined whether the accelerator opening degree, which is detected thorough the accelerator sensor 27, is equal to or less than a predetermined value. When it is determined that the accelerator opening degree is equal to or less than the predetermined value at step 261, the operation proceeds to step 264. At step 264, the ETC cooperative downshift execution flag xEtc is set to OFF, and thereby the engine output increase control operation (throttle opening degree control operation and fuel injection restart control operation) is prohibited.

In contrast, when it is determined that the accelerator opening degree is greater than the predetermined value at step 261, the operation proceeds to step 262. At step 262, it is determined whether the hydraulic fluid temperature (oil temperature) is equal to or greater than a predetermined value. When it is determined that the hydraulic fluid temperature is equal to or greater than the predetermined value at step 262, the operation proceeds to step 264. At step 264, the ETC cooperative downshift execution flag xEtc is set to OFF, and thereby the engine output increase control operation (throttle opening degree control operation and fuel injection restart control operation) is prohibited.

In contrast, when it is determined that the hydraulic fluid temperature is less than the predetermined value at step 262, the operation proceeds to step 263. At step 263, it is determined whether an elapsed time period since the time of reaching or exceeding a predetermined difference between the engine rotational speed Ne and the input shaft rotational speed Nt (i.e., the time of achieving the condition of Ne−Nt≧predetermined value) is equal to or less than a predetermined time period. When it is determined that the elapsed time period since the time of reaching or exceeding the predetermined difference between the engine rotational speed Ne and the input shaft rotational speed Nt (i.e., the time of achieving the condition of Ne−Nt≧predetermined value) is equal to or less than the predetermined time period, it is determined that it is still in a period of a fuel cut delay at step 263. When it is determined that it is still in the period of fuel cut delay at step 263, the operation proceeds to step 264. At step 264, the ETC cooperative downshift execution flag xEtc is set to OFF, and thereby the engine output increase control operation (throttle opening degree control operation and fuel injection restart control operation) is prohibited.

When NO is returned at any of steps 261-263, the present routine is terminated. In this case, the engine output increase control operation (throttle opening degree control operation and fuel injection restart control operation) is permitted.

Figure 20:
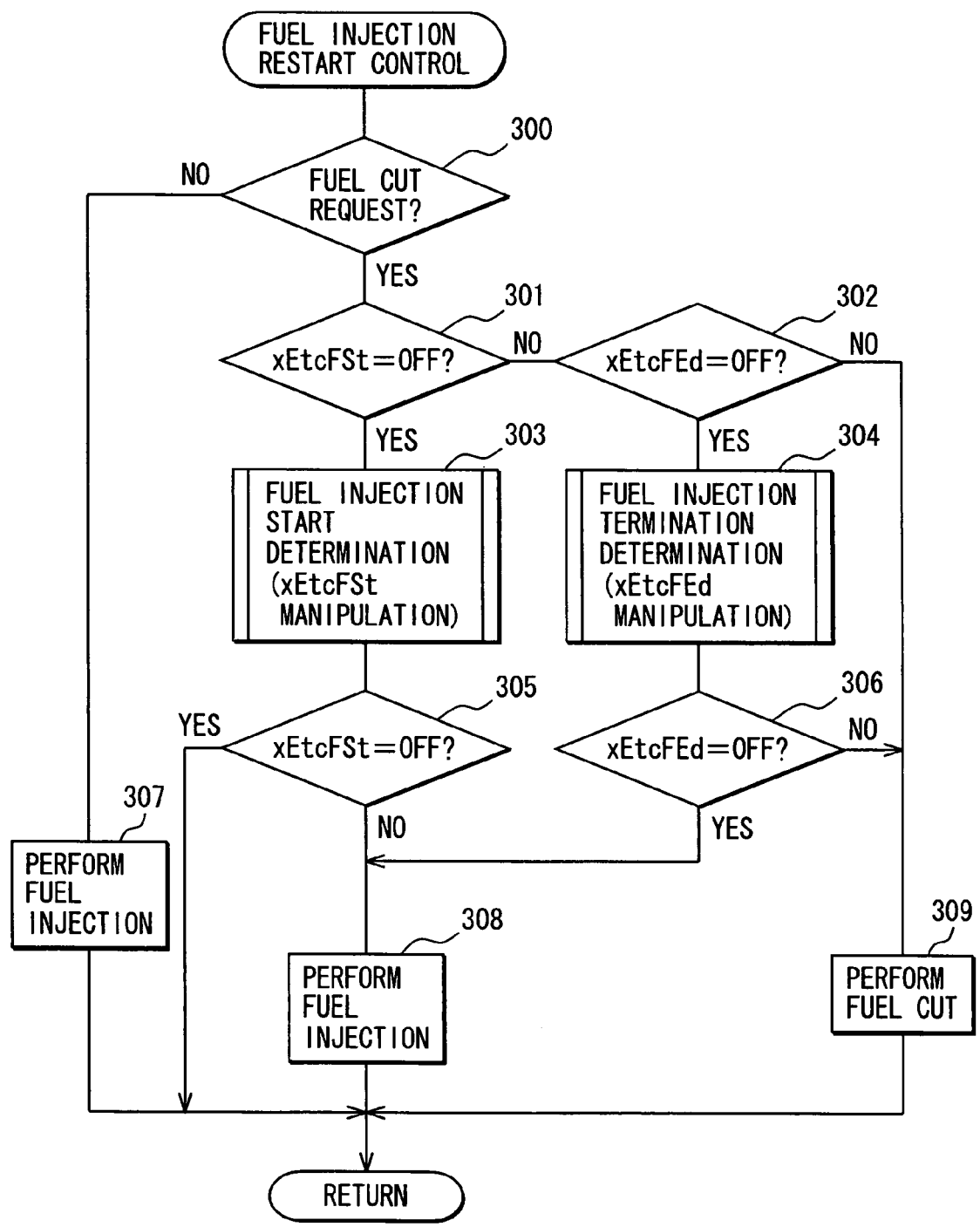
FIG. 20 is a flowchart showing a fuel injection restart control routine according to the first embodiment.

Next, the fuel injection restart control routine will be described in detail with reference to FIG. 20. The fuel injection restart control routine of FIG. 20 is a sub-routine, which is executed at step 104 of the gear shift control routine of FIG. 8 and serves as the engine output increase control means. When the routine of FIG. 20 is executed, first, at step 300, it is determined whether a fuel cut request is present in the engine control operation performed by the engine ECU 25 based on fuel cut information, which is transmitted from the engine ECU 25 to the AT-ECU 70. When it is determined that the fuel cut request is not present in the engine control operation at step 300, the operation proceeds to step 307 where the fuel injection is maintained.

In contrast, when it is determined that the fuel cut request is present in the engine control operation (i.e., in the middle of the fuel cut operation) at step 300, the operation proceeds to step 301. At step 301, it is determined whether the fuel injection restart control operation start flag xEtcFSt is OFF (i.e., whether it is still before starting of the fuel injection restart control operation). When it is determined whether the fuel injection restart control operation start flag xEtcFSt is OFF at step 301, the operation proceeds to step 303. At step 303, a fuel injection start determination routine of FIG. 21, which will be described later, is executed to determine whether it is the time for starting the fuel injection restart control operation. Based on the result of this determination at step 303, the fuel injection restart control operation start flag xEtcFSt is set or reset.

Thereafter, the operation proceeds to step 305. At step 305, it is determined whether the fuel injection restart control operation start flag xEtcFSt is still OFF. When it is determined that the fuel injection restart control operation start flag xEtcFSt is still OFF at step 305, the present routine is terminated. In contrast, when it is determined that the fuel injection restart control operation start flag xEtcFSt is set to ON at step 305, the operation proceeds to step 308. At step 308, the fuel injection is performed at the injector 20.

Returning to step 301, when it is determined that the fuel injection restart control operation start flag xEtcFSt is set to ON (i.e., it is in the middle of the fuel injection restart control operation), the operation proceeds to step 302. At step 302, it is determined whether the fuel injection restart control operation termination flag xEtcFEd is OFF (i.e., it is before the termination of the fuel injection restart control operation). When it is determined that the fuel injection restart control operation termination flag xEtcFEd is OFF at step 302, the operation proceeds to step 304. At step 304, a fuel injection termination determination routine of FIG. 22, which will be described later, is executed to determine whether it is the time for terminating the fuel injection restart control operation. Based on the result of the determination at step 304, the fuel injection restart control operation termination flag xEtcFEd is set or reset.

Thereafter, the operation proceeds to step 306 where it is determined whether the fuel injection restart control operation termination flag xEtcFEd is still OFF. When it is determined that the fuel injection restart control operation termination flag xEtcFEd is still OFF at step 306, the operation proceeds to step 308. At step 308, the fuel injection is performed.

In contrast, when it is determined that the fuel injection restart control operation termination flag xEtcFEd is set to ON (i.e., it is the time for terminating the fuel injection restart control operation) at step 306, the operation proceeds to step 309. At step 309, the fuel cut is restarted.

Figure 21:
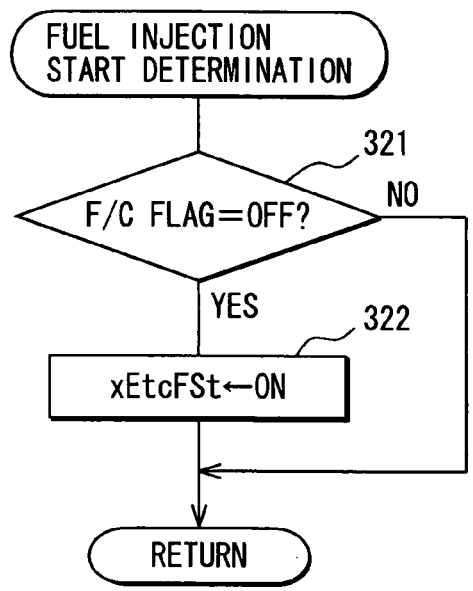
FIG. 21 is a flowchart showing a fuel injection start determination routine according to the first embodiment.

Next, the fuel injection start determination routine will be described in detail with reference to FIG. 21. The fuel injection start determination routine of FIG. 21 is a sub-routine, which is executed at step 303 of the fuel injection restart control routine of FIG. 20. When the routine of FIG. 21 is executed, first, at step 321, it is determined whether a F/C flag (fuel cut flag) is OFF based on the fuel cut information, which is transmitted from the engine ECU 25 to the AT-ECU 70. When it is determined that the F/C flag (fuel cut flag) is OFF at step 321, the operation proceeds to step 322. At step 322, the fuel injection restart control operation start flag xEtcFSt is set to ON, and the present routine is terminated. In contrast, when it is determined that the F/C flag (fuel cut flag) is ON at step 321, the present routine is terminated.

Figure 22:
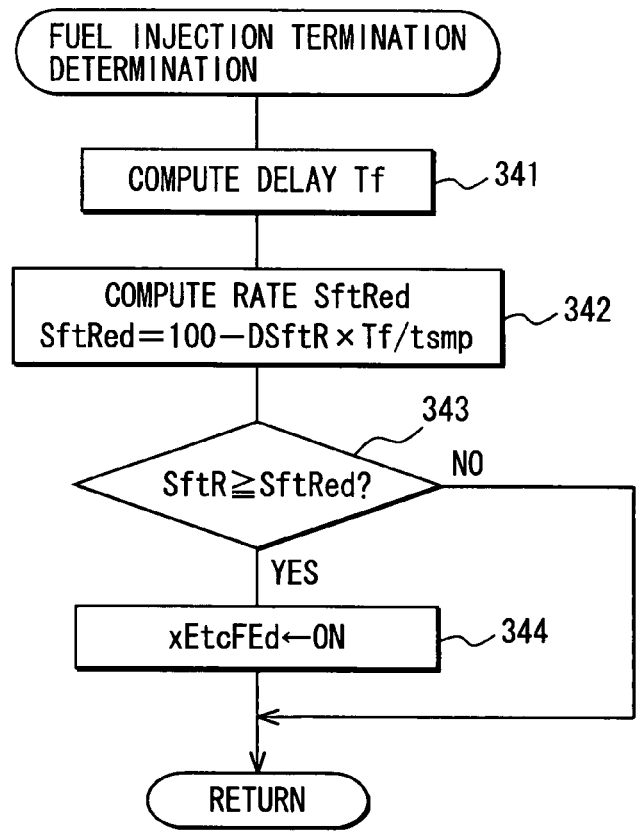
FIG. 22 is a flowchart showing a fuel injection termination determination routine according to the first embodiment of the present invention.

Next, the fuel injection termination determination routine will be described in detail with reference to FIG. 22. The fuel injection termination determination routine of FIG. 22 is a sub-routine, which is executed at step 304 of the fuel injection restart control routine of FIG. 20. When the routine of FIG. 22 is executed, first, at step 341, a response delay (Tf) from the time of restarting the fuel cut to the time of loss of the engine output is computed. At this time, the time period T720° CA, which is required for the crankshaft to rotate through 720° CA, is computed as the response delay (Tf).

Thereafter, the operation proceeds to step 342 where a gear shift progress rate SftRed at the time of terminating the fuel injection restart control operation (at the time of starting the termination control operation) is computed according to the following equation.

$$Sft\text{Red} = 100 - DSftR \times Tf/tsmp$$

In the above equation, DSftR is a change amount (i.e., the current value of SftR−the previous value of SftR) per computation cycle of the gear shift progress rate SftR, and tsmp is the computation cycle of DSftR.

Thereafter, the operation proceeds to step 343. At step 343, it is determined whether the current gear shift progress rate SftR becomes equal to or greater than the above SftRed. When it is determined that the current gear shift progress rate SftR has not become equal to or greater than the above SftRed at step 343, the present routine is terminated. In contrast, when it is determined that the current gear shift progress rate SftR becomes equal to or greater than the above SftRed at step 343, the operation proceeds to step 344. At step 344, the fuel injection restart control operation termination flag xEtcFEd is set to ON.

According to the first embodiment, there is provided the system that performs the engine output increase control operation (throttle opening degree control operation and fuel injection restart control operation) to increase the engine output in the absence of the operation of the accelerator by the driver at the time of performing the ETC cooperative downshift control operation based upon the driver's demand for deceleration. When the system performs the engine output increase control operation, the preliminary output increase control operation is performed first in the first step to slightly increase the engine output preliminarily. Thereafter, the main output increase control operation is performed in the second step to increase the engine output substantially to perform the next gear shift. Therefore, the preliminary output increase control operation is started at the timing, which is earlier than the start timing of the conventional engine output increase control operation. Through this preliminary output increase control operation, the input shaft rotational speed Nt or the gear ratio Gr of the transmission gear mechanism 55 is slightly increased, and thereafter, the main output increase control operation is executed. In this way, at the time of performing the downshift based upon the driver's demand for deceleration, the engine output increase control operation is reliably started regardless of the design of the automatic transmission 51. Therefore, it possible to limit the gear shift shock at the time of the downshift, and it is possible to shorten the total gear shift time period at the time of the downshift.

Furthermore, according to the first embodiment, when the input shaft rotational speed Nt (or the gear ratio Gr) is increased by the predetermined amount K or more through the preliminary output increase control operation, it is determined that the hydraulic pressure of the friction element at the higher speed gear stage (i.e., the hydraulic pressure of the off-going friction element) is reduced and becomes equal to or less than the hydraulic pressure, which corresponds to the transmission torque capacity and which does not cause the acceleration feeling or the gear shift shock even upon starting the main output increase control operation. Thereafter, the main output increase control operation is started. Therefore, the timing for starting the main output increase control operation can be relatively accurately set, and the driver may not substantially feel the acceleration or the gear shift shock, which would be otherwise caused by the main output increase control operation. Furthermore, the start timing of the main output increase control operation can be set without relying on the timer recited in Japanese Patent JP-B2-2924463. Therefore, the main output increase control operation can be performed with the simple logic structure and the smaller number of parameters, thereby allowing the easy practical implementation.

Second Embodiment

A second embodiment of the present invention will be described with reference to FIG. 23. The second embodiment is similar to the first embodiment except the condition for starting the main output increase control operation. In the following description, this difference will be mainly described.

Specifically, when the friction element (the off-going friction element) at the higher speed gear stage is disengaged at the shortage of the engine output increase in the preliminary output control operation in the given gear shift type, the input shaft rotational speed Nt or the gear ratio Gr tends to be reduced. In such a case, even when the preliminary output increase control operation is performed a relatively long period of time according to the first embodiment, the input shaft rotational speed Nt or the gear ratio Gr cannot be increased by predetermined amount K or more. Thus, the operation cannot be shifted to the main output increase control operation.

Figure 23:
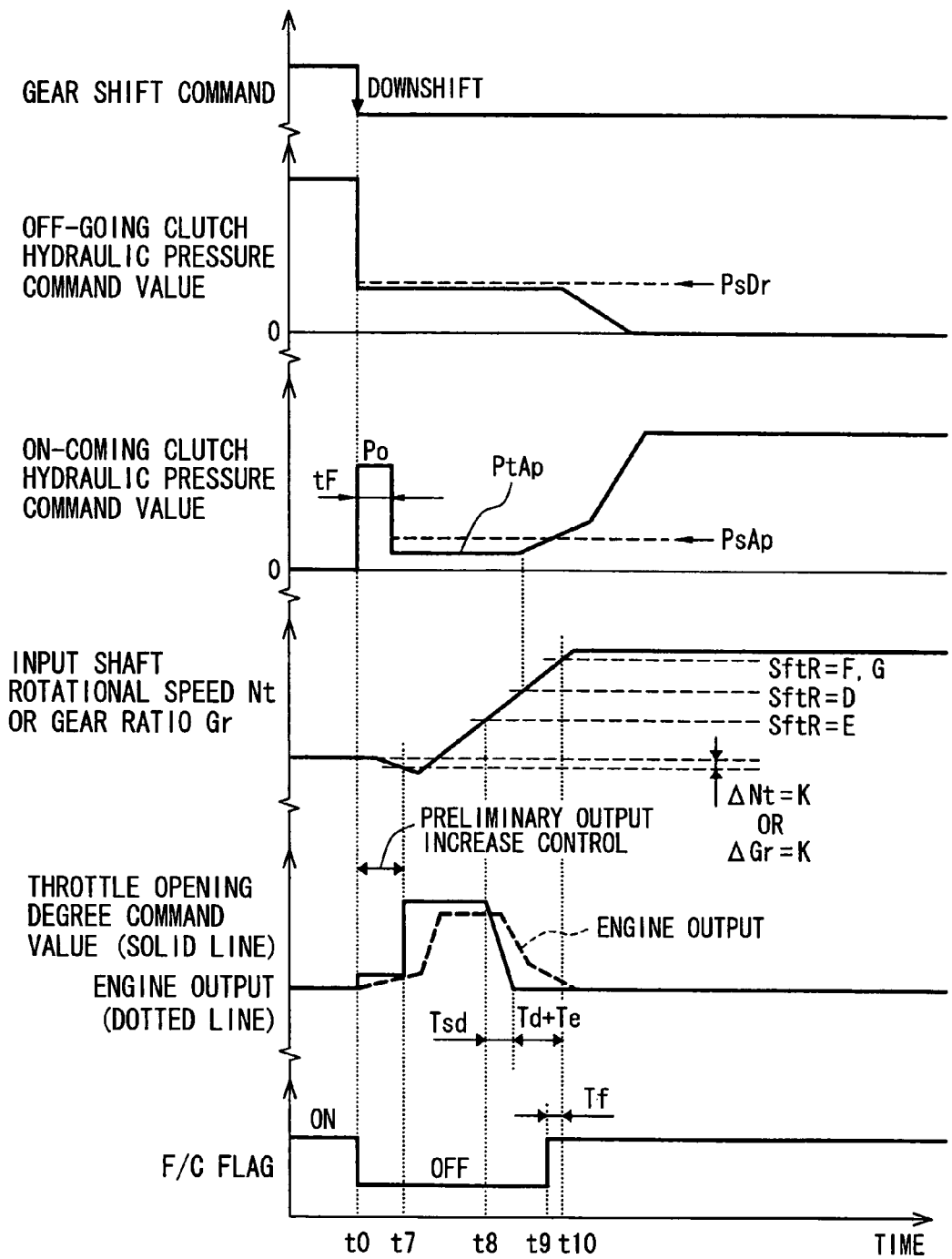
FIG. 23 is a time chart showing an example of an ETC cooperative downshift control operation according to a second embodiment of the present invention.

To address the above disadvantage, according to the second embodiment shown in FIG. 23, when it is detected that the input rotational speed Nt of the transmission gear mechanism 55 is increased or decreased by the predetermined amount K or more through the preliminary output increase control operation (or it is detected that the gear ratio Gr is increased or decreased by the predetermined amount K or more), the main output increase control operation is started. This is due to the following reason. That is, besides the above case where the input shaft rotational speed Nt or the gear ratio Gr is increased by the predetermined amount K or more, even in the other case where the input shaft rotational speed Nt or the gear ratio Gr is decreased by the predetermined amount K or more, it is possible to determine that the hydraulic pressure of the friction element at the higher speed gear stage (i.e., the hydraulic pressure of the off-going friction element) is reduced and becomes equal to or less than the hydraulic pressure, which corresponds to the transmission torque capacity and which does not cause the acceleration feeling or the gear shift shock even upon starting the main output increase control operation. In this way, the main output increase control operation can be reliably started even in the case where the friction element at the higher speed gear stage is disengaged at the shortage of the engine output increase in the preliminary output control operation in the given gear shift type to cause the decrease in the input shaft rotational speed Nt or the gear ratio Gr.

Third Embodiment

A third embodiment of the present invention will be described with reference to FIGS. 24 and 25. The third embodiment is similar to the first embodiment except the preliminary output increase control operation. In the following description, this difference will be mainly described.

In general, there are variations in the amount of the engine output increase in the preliminary output increase control operation. Thus, when the engine output is increased to coincide the engine rotational speed Ne to the target value, which is slightly higher than the input shaft rotational speed Nt, during the preliminary output increase control operation, as shown in FIG. 7, the engine rotational speed Ne may become lower than the target value or may become higher than the target value.

Figure 24:
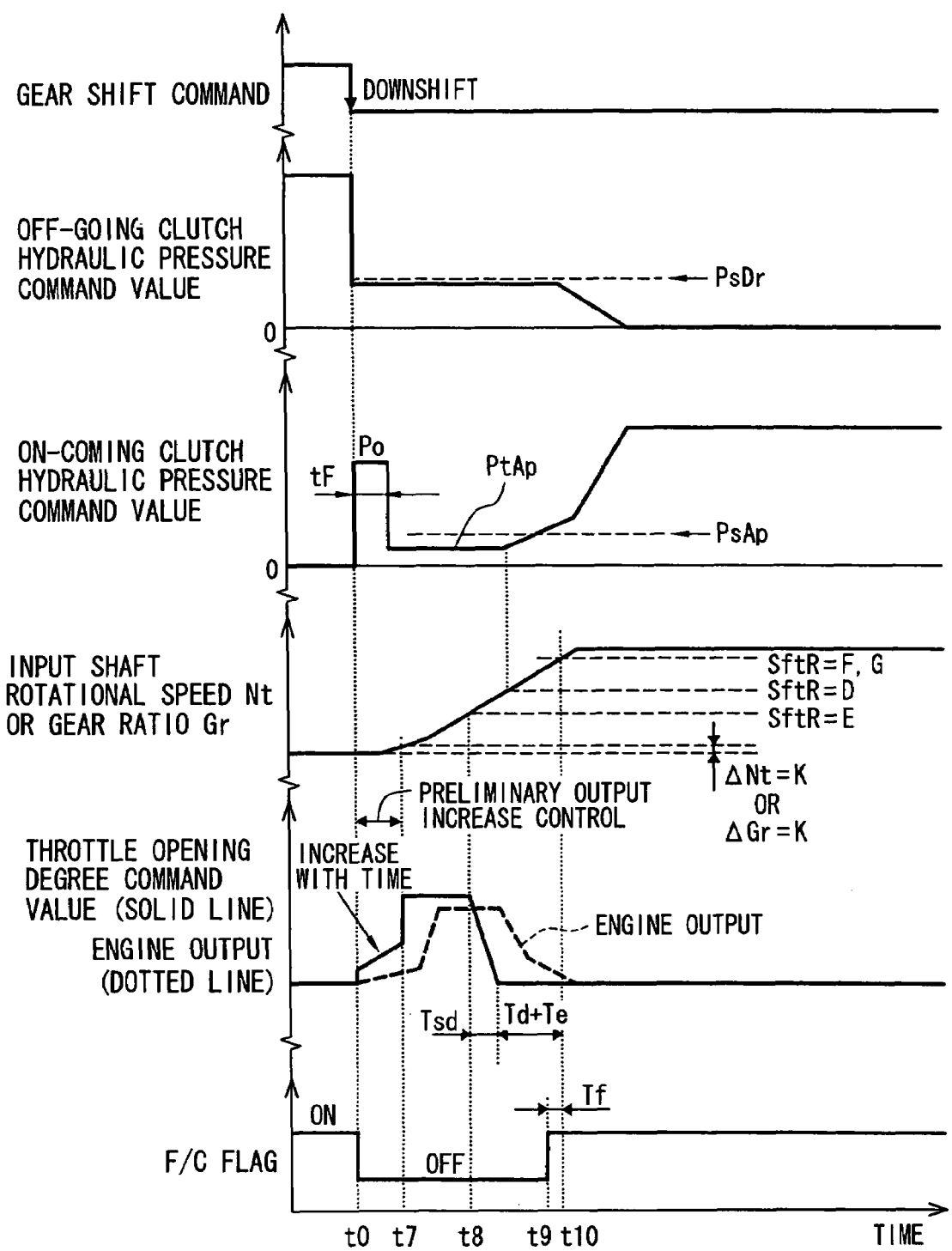
FIG. 24 is a time chart showing an example of an ETC cooperative downshift control operation control according to a third embodiment of the present invention.
Figure 25:
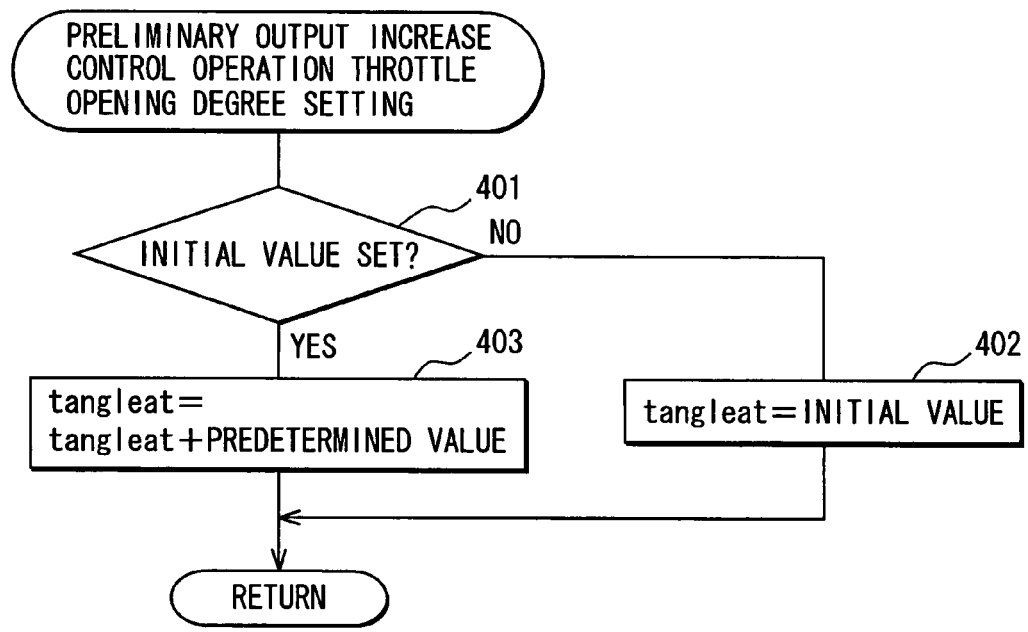
FIG. 25 is a flowchart showing a preliminary output increase control operation throttle opening degree setting routine according to the third embodiment.

To address the above point, according to the third embodiment shown in FIGS. 24 and 25, the engine output (the throttle opening degree command value) is gradually and progressively increased with the time during the preliminary output increase control operation.

Next, the details of the preliminary output increase control operation according to the third embodiment will be described with reference to FIG. 25.

In the third embodiment, at step 211 of the throttle opening degree control routine shown in FIG. 13, a preliminary output increase control operation throttle opening degree setting routine of FIG. 25 is executed. Other than this routine, the operations are similar to those of the first embodiment. When the preliminary output increase control throttle opening degree setting routine of FIG. 25 is executed, first, at step 401, it is determined whether an initial value of the throttle opening degree command value tangleat (throttle opening degree) at the beginning of the preliminary output increase control operation is already set. When it is determined that the initial value of the throttle opening degree command value tangleat (throttle opening degree) at the beginning of the preliminary output increase control operation is not already set at step 401, the operation proceeds to step 402. At step 402, the throttle opening degree command value tangleat is set to a predetermined initial value. In this case, the initial value of the throttle opening degree command value tangleat is set to a value that does not exceed the target value even at the upper limit of the engine output variations.

After setting the initial value, "YES" is returned at step 401 every time this routine is executed, and the operation proceeds to step 403. At step 403, a predetermined value is added to the previous value of the throttle opening degree command value tangleat to set a current value of the throttle opening degree command value tangleat. In this way, every time the present routine is executed, the throttle opening degree command value tangleat is increased by the predetermined value. Thus, the acceleration or the gear shift shock of the vehicle can be reliably limited at the beginning of the preliminary output increase control operation while limiting the decrease in the input shaft rotational speed Nt or the gear ratio Gr.

Here, it should be noted that the initial value of the throttle opening degree command value tangleat at the beginning of the preliminary output increase control operation may be set to the same value as that of the throttle opening degree command value used immediately before the start of the preliminary output increase control operation, and this initial value of the throttle opening degree command value tangleat may be gradually and progressively increased with time.

Fourth Embodiment

A fourth embodiment of the present invention will be described with reference to FIGS. 26 and 27. The fourth embodiment is similar to the first embodiment except the preliminary output increase control operation. In the following description, this difference will be mainly described.

In the third embodiment where the throttle opening degree command value tangleat (engine output) is gradually and progressively increased with time during the preliminary output increase control operation, when the time of performing the preliminary output increase control operation is lengthened, the throttle opening degree command value tangleat (engine output) may possibly become excessively large.

Figure 27:
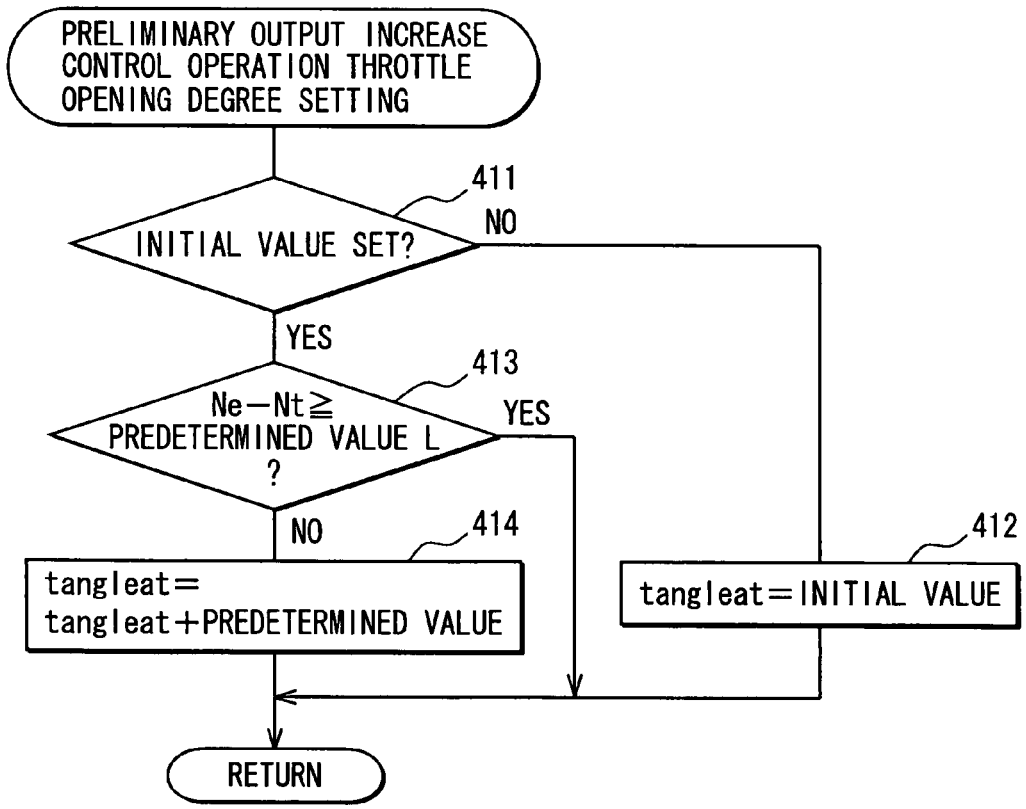
FIG. 27 is a flowchart showing a preliminary output increase control operation throttle opening degree setting routine according to the fourth embodiment.
Figure 26:
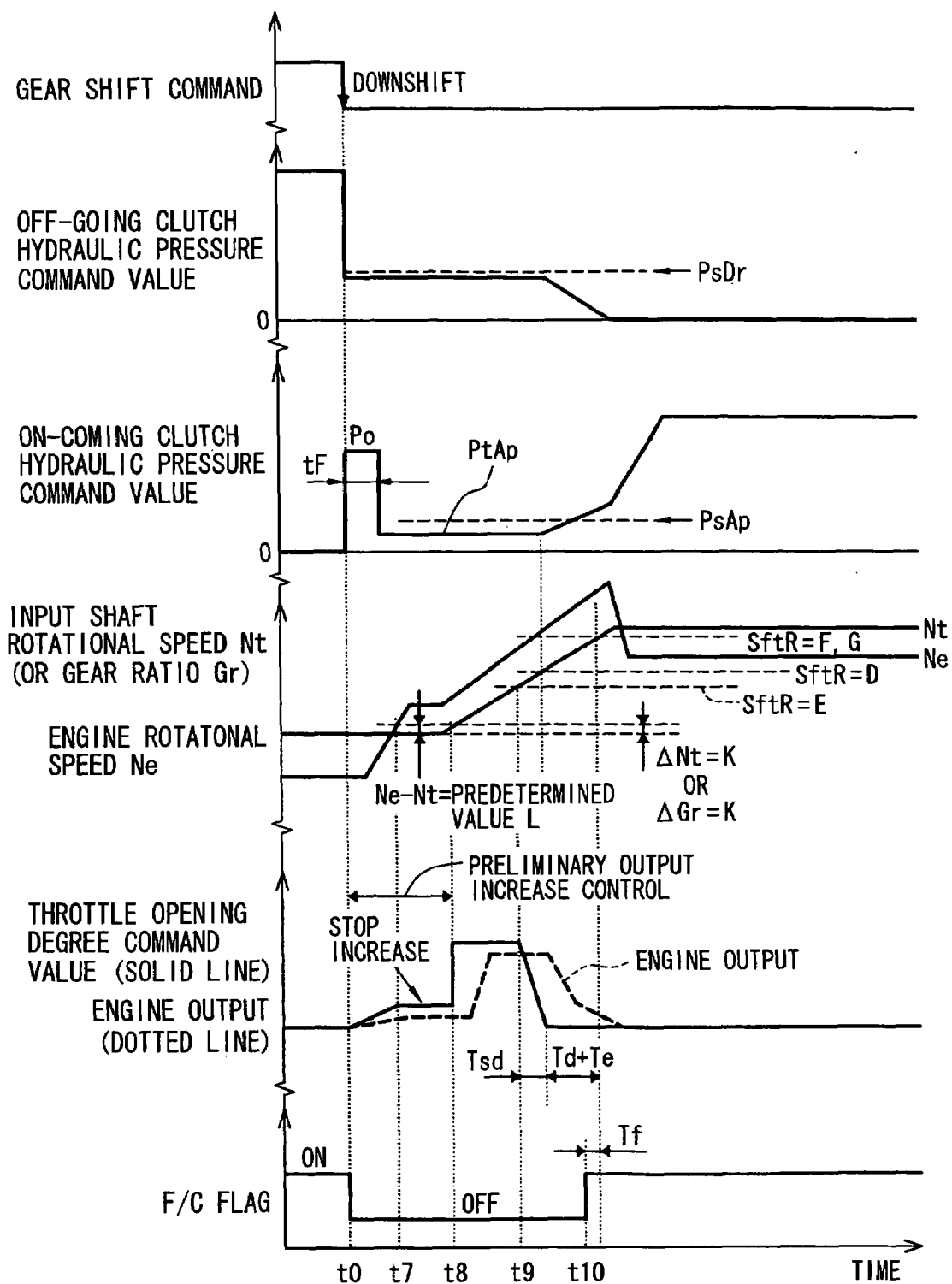
FIG. 26 is a time chart showing an example of an ETC cooperative downshift control operation according to a fourth embodiment of the present invention.

To address this, according to the fourth embodiment shown in FIGS. 26, 27, in the case where the throttle opening degree command value tangleat (engine output) is gradually and progressively increased with time during the preliminary output increase control operation, the increasing of the throttle opening degree command value tangleat (engine output) is stopped to maintain the current throttle opening degree command value tangelat (engine output) at a time point t7, at which the difference (i.e., Ne–Nt) between the engine rotational speed Ne and the input shaft rotational speed Nt becomes equal to or greater than a predetermined value L.

According to the fourth embodiment, at step 211 of the throttle opening degree control routine shown in FIG. 13, a preliminary output increase control throttle opening degree setting routine of FIG. 27 is executed. Other than this routine, the operations are similar to those of the first embodiment. When the preliminary output increase control operation throttle opening degree setting routine of FIG. 27 is executed, first, at step 411, it is determined whether an initial value of the throttle opening degree command value tangleat (throttle opening degree) at the beginning of the preliminary output increase control operation is already set. When it is determined that the initial value of the throttle opening degree command value tangleat (throttle opening degree) at the beginning of the preliminary output increase control operation is not already set, the operation proceeds to step 412. At step 412, the throttle opening degree command value tangleat is set to a predetermined initial value. In this case, the initial value of the throttle opening degree command value tangleat is set to a value that does not exceed the target value even at the upper limit of the engine output variations. Alternatively, the initial value of the throttle opening degree command value tangleat at the beginning of the preliminary output increase control operation may be set to the same value as that of the throttle opening degree command value used immediately before the start of the preliminary output increase control operation.

After setting the initial value, "YES" is returned at step 411 every time this routine is executed, and the operation proceeds to step 413. At step 413, it is determined whether the difference (i.e., Ne–Nt) between the engine rotational speed Ne and the input shaft rotational speed Nt is equal to or greater than a predetermined value L. When it is determined that the difference (i.e., Ne–Nt) between the engine rotational speed Ne and the input shaft rotational speed Nt is less than the predetermined value L at step 413, the operation proceeds to step 414. At step 414, a predetermined value is added to the previous value of the throttle opening degree command value tangleat to set a current value of the throttle opening degree command value tangleat. In this way, as long as the difference (i.e., Ne–Nt) between the engine rotational speed Ne and the input shaft rotational speed Nt is less than the predetermined value L, the throttle opening degree command value tangleat is increased by the predetermined value.

In contrast, when it is determined that the difference (i.e., Ne–Nt) between the engine rotational speed Ne and the input shaft rotational speed Nt is equal to or greater than the predetermined value L at step 413, the present routine is terminated. Thus, as long as the the difference (i.e., Ne–Nt) between the engine rotational speed Ne and the input shaft rotational speed Nt is equal to or greater than the predetermined value L, the increasing of the throttle opening degree command value tangleat (engine output) is stopped, and the current throttle opening degree command value tangleat is maintained.

In this way, the excessive increasing of the throttle opening degree command value tangleat (engine output) can be avoided, and it is possible to wait until the disengagement of the friction element at the higher speed gear stage (the disengagement of the off-going element) while limiting the acceleration of the vehicle, which would be otherwise caused by the preliminary output increase control operation.

Fifth Embodiment

Figure 28:
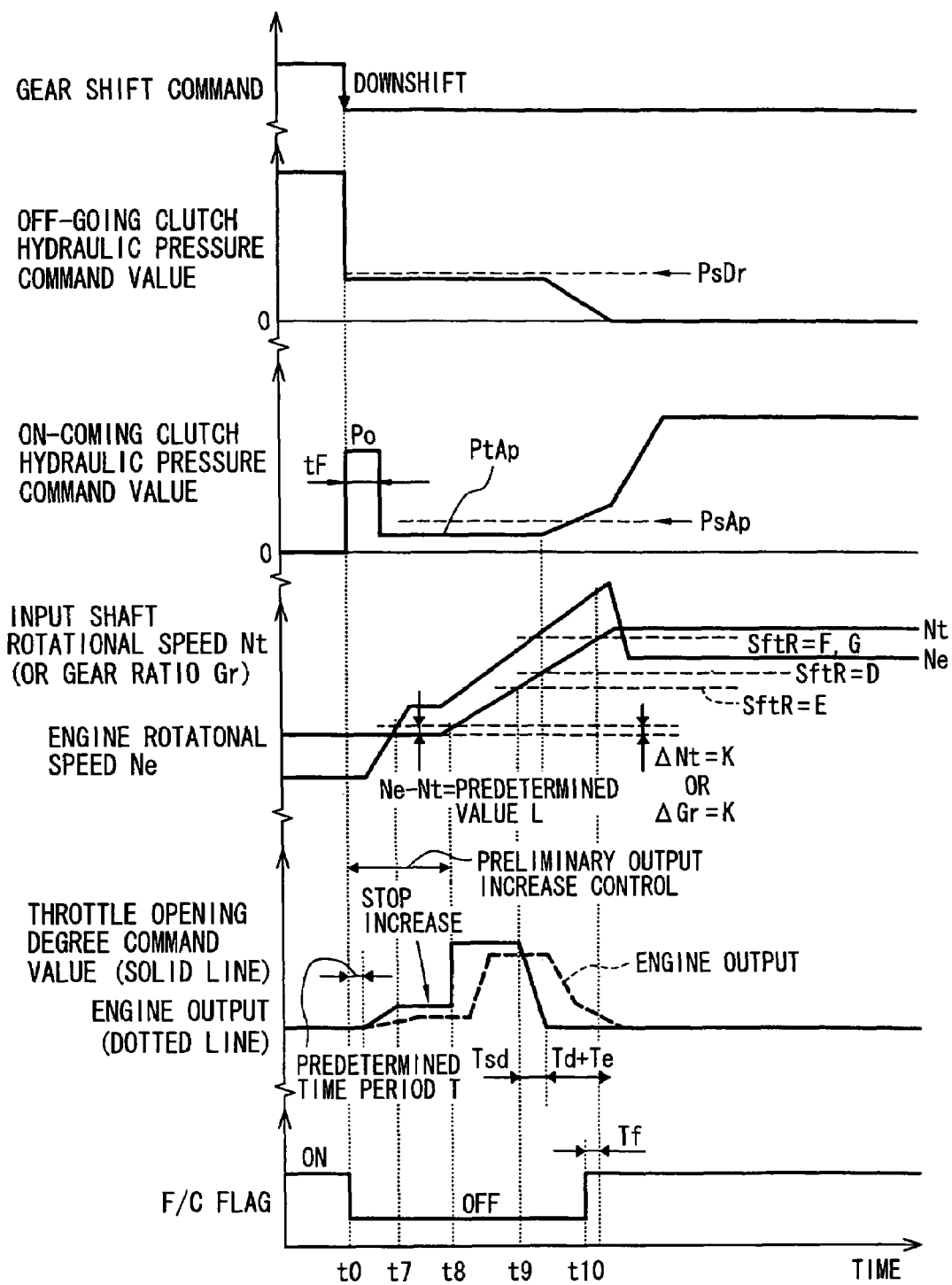
FIG. 28 is a time chart showing an example of an ETC cooperative downshift control operation according to a fifth embodiment of the present invention.

A fifth embodiment of the present invention will be described with reference to FIGS. 28 to 30. The fifth embodiment is similar to the first embodiment except the preliminary output increase control operation. In the following description, this difference will be mainly described.

In the first to fourth embodiments, the preliminary output increase control operation is started immediately at the time t0, at which the downshift control operation is started (or at the time point, at which a disengaging command of the off-going friction element is outputted) in view of the fact that the friction element at the higher speed gear stage (the off-going friction element) is immediately disengaged immediately after the starting of the downshift control operation. However, in the fifth embodiment shown in FIGS. 28 to 30, the preliminary output increase control operation is started after elapse of a predetermined time period T since the start of the downshift control operation (or since the time of outputting the disengaging command of the off-going friction element). Here, the predetermined time period T is set to correspond with a time period, which is required to disengage the friction element at the higher speed gear stage (the off-going friction element). In this way, the starting of the preliminary output increase control operation during the engaged period of the friction element at the higher speed gear stage (the off-going friction element) can be limited, and thereby the acceleration of the vehicle by the preliminary output increase control operation can be reliably limited.

Figure 29:
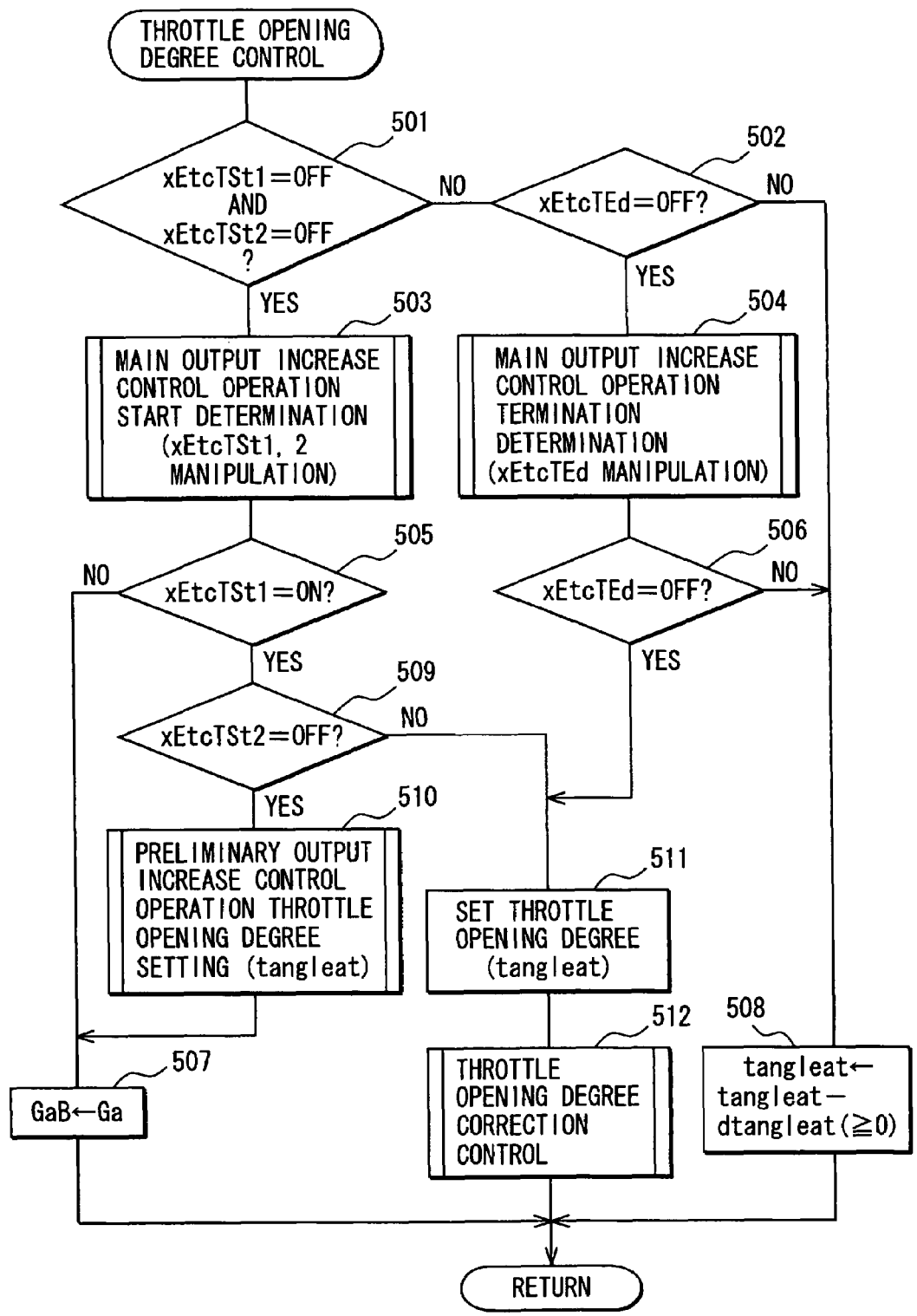
FIG. 29 is a flowchart showing a throttle opening degree control routine according to the fifth embodiment.

In the fifth embodiment, a throttle opening degree control routine of FIG. 29 is executed at step 103 of the gear shift control routine of FIG. 8. When the routine of FIG. 29 is executed, first, at step 501, it is determined whether OFF of the preliminary output increase control operation start flag xEtcTSt1 (i.e, xEtcTSt1 =OFF) and OFF of the main output increase control operation start flag xEtcTSt2 (xEtcTSt2=OFF) are both met. When it is determined that OFF of the preliminary output increase control operation start flag xEtcTSt1 (i.e, xEtcTSt1=OFF) and OFF of the main output increase control operation start flag xEtcTSt2 (xEtcTSt2=OFF) are both met at step 501, the operation proceeds to step 503. At step 503, a throttle opening degree control operation start determination routine of FIG. 30, which will be described later, is executed to determine the timing for starting the preliminary output increase control operation and the timing for starting the main output increase control operation are determined. Then, based on the result of this determination, each of the preliminary output increase control operation start flag xEtcTSt1 and the main output increase control operation start flag xEtcTSt2 is set or reset.

Thereafter, the operation proceeds to step 505. At step 505, it is determined whether the preliminary output increase control operation start flag xEtcTSt1 is set to ON (indicating the starting of the preliminary output increase control operation). When it is determined that the preliminary output increase control operation start flag xEtcTSt1 is set to OFF at step 505, the operation proceeds to step 507. At step 507, the stored value GaB of the intake air quantity is renewed with the currently measured value Ga of the air flow meter 14, and the present routine is terminated.

When it is determined that the preliminary output increase control operation start flag xEtcTSt1 is set to ON (indicating the starting of the preliminary output increase control operation), the operation proceeds to step 509. At step 509, it is determined whether the main output increase control operation start flag xEtcTSt2 is set to OFF. When it is determined that the main output increase control operation start flag xEtcTSt2 is set to OFF at step 509, the operation proceeds to step 510. At step 510, the preliminary output increase control operation throttle opening degree setting routine of FIG. 27 is executed to set the throttle opening degree command value tangleat used in the preliminary output increase control operation. Then, at step 507, the stored value GaB of the intake air quantity is renewed with the measured value Ga of the air flow meter 14, and the present routine is terminated.

When it is determined that the main output increase control operation start flag xEtcTSt2 is set to ON (indicating the starting of the main output increase control operation) at step 509, the operation proceeds to step 511. At step 511, the throttle opening degree command value tangleat (throttle opening degree) used in the main output increase control operation is set based on the gear shift type, the engine coolant temperature and the input shaft rotational speed Nt in view of the corresponding main output increase control operation throttle opening degree setting map shown in FIG. 18A or 18B, which is described in the first embodiment. Thereafter, the operation proceeds to step 512 where the throttle opening degree correction control routine of FIG. 16, which is described in the first embodiment, is executed, and the present routine is terminated.

When NO is returned at step 501, i.e., when the preliminary output increase control operation or the main output increase control operation is already started, the operation proceeds to step 502. At step 502, it is determined whether the main output increase control operation termination flag xEtcTEd is set to OFF (indicating that it is before termination of the main output increase control operation). When it is determined that the main output increase control operation termination flag xEtcTEd is set to OFF at step 502, the operation proceeds to step 504. At step 504, the main output increase control operation termination determination routine of FIG. 15, which is described in the first embodiment, is executed to determine whether it is the time for terminating the main output increase control operation. Based on the result of this determination, the main output increase control operation termination flag xEtcTEd is set or reset.

Thereafter, the operation proceeds to step 506 where it is determined whether the main output increase control operation termination flag xEtcTEd is still OFF. When it is determined that the main output increase control operation termination flag xEtcTEd is still OFF at step 506, the operation proceeds to step 511 and step 512, and the main output increase control operation is continued.

When it is determined that the main output increase control operation termination flag xEtcTEd is set to ON at step 506, the operation proceeds to step 508. At step 508, the termination control operation is executed. Specifically, at step 508, the throttle opening degree command value tangleat is corrected by reducing the throttle opening degree command value tangleat by a predetermined amount dtangleat, so that the throttle opening degree command value tangleat is reduced to zero (0) at the predetermined rate.

Figure 30:
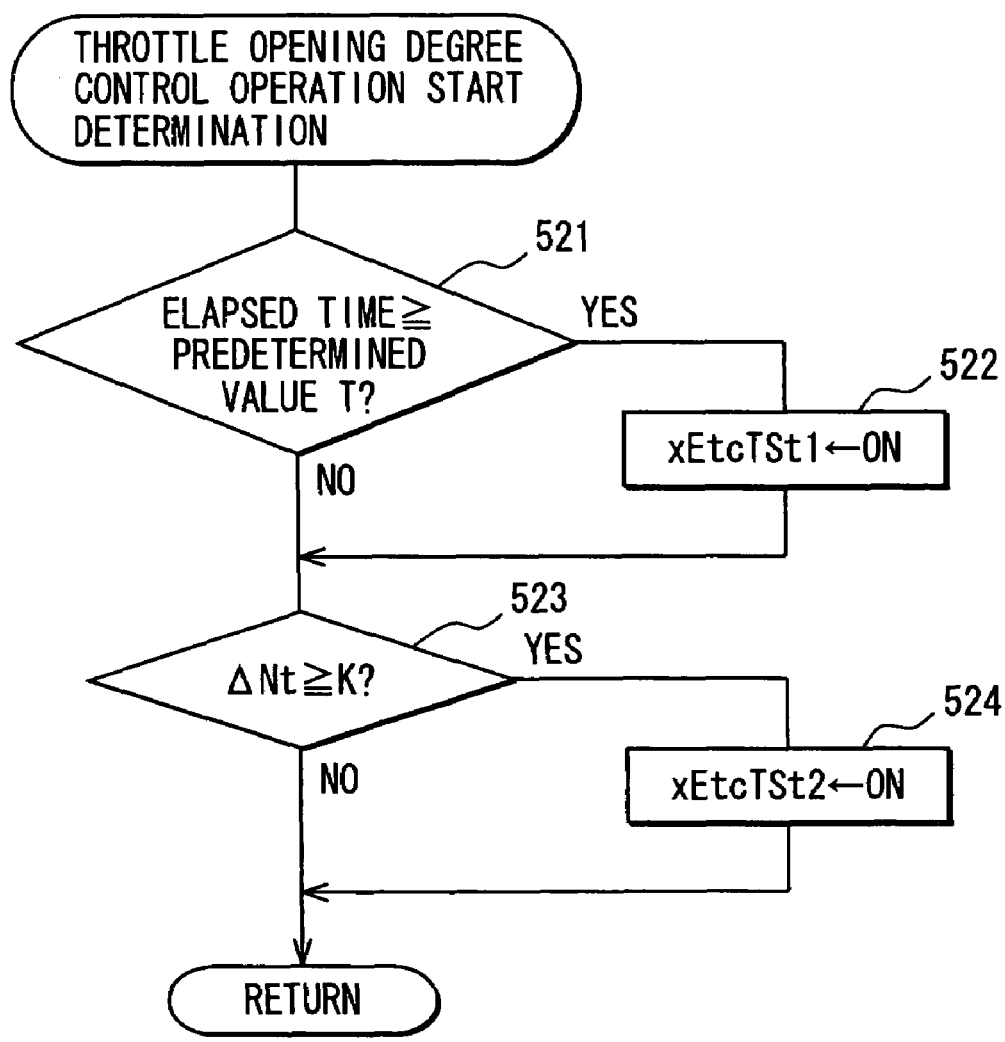
FIG. 30 is a flowchart showing a throttle opening degree control operation start determination routine according to the fifth embodiment.

When the throttle opening degree control operation start determination routine of FIG. 30 is executed at step 503, it is determined whether an elapsed time period since the time of starting the downshift control operation (or since the time of outputting the disengaging command for the off-going friction element) becomes equal to or greater than a predetermined value T at step 521. When NO is returned at step 521, the operation proceeds to step 523. In contrast, when YES is returned at step 521, the operation proceeds to step 522. At step 522, the preliminary output increase control operation start flag xEtcTSt1 is set to ON (indicating starting of the preliminary output increase control operation), and the operation proceeds to step 523.

At step 523, it is determined whether an increase amount ΔNt of the input shaft rotational speed Nt (or an increase amount ΔGr of the gear ratio Gr) since the time of starting the ETC cooperative downshift control operation is equal to or greater than a predetermined amount K. When it is determined that the increase amount ΔNt of the input shaft rotational speed Nt (or the increase amount ΔGr of the gear ratio Gr) is not equal to or greater than the predetermined amount K at step 523, it is determined that the start timing for starting the main output increase control operation has not come yet, and the present routine is terminated.

Thereafter, when it is determined that the increase amount ΔNt of the input shaft rotational speed Nt (or the increase amount ΔGr of the gear ratio Gr) is equal to or greater than the predetermined amount K at step 523, it is determined that the start timing for starting the main output increase control operation is reached, and the operation proceeds to step 524. At step 524, the main output increase control operation start flag xEtcTSt2 is set to ON, and the present routine is terminated.

According to the fifth embodiment, the preliminary output increase control operation is started upon elapse of the predetermined time period T since the time of starting the downshift control operation or since the time of outputting the disengaging command for the off-going friction element. Thus, it is possible to limit the starting of the preliminary output increase control operation during the engaged period of the off-going friction element. Thus, the acceleration of the vehicle, which would be otherwise caused by the preliminary output increase control operation is reliably limited.

In each of the above embodiments, the engine output increase control operation is implemented by the throttle opening degree control operation and the fuel injection restart control operation. However, a fuel increase control operation or an ignition timing retardation control operation may be added to the engine output increase control operation. Alternatively, the throttle opening degree control operation and the fuel injection restart control operation may be replaced with the fuel increase control operation or the ignition timing retardation control operation. Even with the above modifications, the engine output increase control operation can be implemented in the similar manner. Furthermore, in each of the above embodiments, the gasoline engine is used as the internal combustion engine. However, even in a case where a diesel engine is used as the internal combustion engine, the control operation for increasing the fuel injection quantity may be implemented as the engine output increase control operation.

Also, the present invention is not limited to each of the above embodiment. For instance, the structure of the automatic transmission may be changed in any appropriate manner.

Additional advantages and modifications will readily occur to those skilled in the art. The invention in its broader terms is therefore not limited to the specific details, representative apparatus, and illustrative examples shown and described.

What is claimed is:

1. A control device for an automatic transmission connected with an internal combustion engine of a vehicle, the control device comprising:
    a hydraulic pressure control means for controlling a hydraulic pressure of each corresponding one of a plurality of friction elements of a gear shift mechanism of the automatic transmission to selectively place each corresponding one of the plurality of friction elements in one of an engaged state and a disengaged state to shift a gear stage of the gear shift mechanism;
    a downshift control means for executing a downshift control operation to control the hydraulic pressure of each corresponding one of the plurality of friction elements and thereby to downshift the gear shift mechanism from a current gear stage to a next gear stage, at which an engine brake is operated, upon receiving a driver's demand for deceleration; and
    an engine output increase control means for executing an engine output increase control operation to increase an engine output of the engine in an absence of a driver's operation on an accelerator of the vehicle during the downshift control operation, which is executed by the downshift control means, wherein when the engine output increase control means executes the engine output increase control operation, the engine output increase control means executes a preliminary output increase control operation to preliminarily, slightly increase the engine output and then executes a main output increase control operation to substantially increase the engine output in preparation for downshifting of the gear shift mechanism to the next gear stage.

2. The control device according to claim 1, wherein the engine output increase control means shifts from the preliminary output increase control operation to the main output increase control operation when an input shaft rotational speed of the gear shift mechanism is increased by a predetermined amount or more upon the execution of the preliminary output increase control operation.

3. The control device according to claim 1, wherein the engine output increase control means shifts from the preliminary output increase control operation to the main output increase control operation when a gear ratio of the gear shift mechanism is increased by a predetermined amount or more upon the execution of the preliminary output increase control operation.

4. The control device according to claim 1, wherein the engine output increase control means shifts from the preliminary output increase control operation to the main output increase control operation upon satisfaction of one of the following conditions:
    an input shaft rotational speed of the gear shift mechanism is increased by a predetermined amount or more upon the execution of the preliminary output increase control operation;
    the input shaft rotational speed of the gear shift mechanism is decreased by a predetermined amount or more upon the execution of the preliminary output increase control operation;
    a gear ratio of the gear shift mechanism is increased by a predetermined amount or more upon the execution of the preliminary output increase control operation; and
    the gear ratio of the gear shift mechanism is decreased by a predetermined amount or more upon the execution of the preliminary output increase control operation.

5. The control device according to claim 1, wherein the engine output increase control means increases the engine output by an amount, which makes an engine rotational speed of the engine slightly higher than an input shaft rotational speed of the gear shift mechanism during the preliminary output increase control operation.

6. The control device according to claim 1, wherein the engine output increase control means progressively increases the engine output with time during the preliminary output increase control operation.

7. The control device according to claim 6, wherein when the engine output increase control means progressively increases the engine output with the time during the preliminary output increase control operation, the engine output increase control means stops the increasing of the engine output and maintains a current engine output of the engine at a timing, at which a difference between an engine rotational speed of the engine and a input shaft rotational speed of the gear shift mechanism becomes equal to or greater than a predetermined value.

8. The control device according to claim 1, wherein the engine output increase control means starts the preliminary output increase control operation simultaneously at one of:
   a time of starting the downshift control operation; and
   a time of generating a disengaging command for disengaging an off-going friction element that is selected from the plurality of friction elements and has been placed in the engaged state in the current gear stage of the gear shift mechanism.

9. The control device according to claim 1, wherein the engine output increase control means starts the preliminary output increase control operation after elapse a predetermined time period from one of:
   a time of starting the downshift control operation; and
   a time of generating a disengaging command for disengaging an off-going friction element, which is selected from the plurality of friction elements and has been placed in the engaged state in the current gear stage of the gear shift mechanism.

10. The control device according to claim 1, wherein when the downshift control means starts the downshift control operation, the downshift control means immediately decreases a hydraulic pressure command value of an off-going friction element, which is selected from the plurality of friction elements and has been placed in the engaged state in the current gear stage of the gear shift mechanism, to a value that is lower than a hydraulic pressure, which corresponds to a set load of a return spring of an on-coming friction element which is selected from the plurality of friction elements and is placed in the engaged state in the next gear stage of the gear shift mechanism.

11. A control device for an automatic transmission connected with an internal combustion engine of a vehicle, the control device comprising:
   a hydraulic pressure control means for controlling a hydraulic pressure of each corresponding one of a plurality of friction elements of a gear shift mechanism of the automatic transmission to selectively place each corresponding one of the plurality of friction elements in one of an engaged state and a disengaged state to shift a gear stage of the gear shift mechanism;
   a downshift control means for controlling the hydraulic pressure of each corresponding one of the plurality of friction elements to downshift the gear shift mechanism from a current gear stage to a next gear stage, at which an engine brake is operated, upon receiving a driver's demand for deceleration; and
   an engine output increase control means for increasing an engine output of the engine by increasing a throttle opening degree of the engine in at least two steps in an absence of a driver's operation on an accelerator of the vehicle at the time of the downshifting of the gear shift mechanism by the downshift control means from the current gear stage to the next gear stage.

12. The control device according to claim 11, wherein:
   the at least two steps includes first and second steps; and
   the engine output increase control means shifts from the first step to the second step when an input shaft rotational speed of the gear shift mechanism is increased by a predetermined amount or more in the first step.

13. The control device according to claim 11, wherein:
   the at least two steps includes first and second steps;

the engine output increase control means shifts from the first step to the second step when a gear ratio of the gear shift mechanism is increased by a predetermined amount or more in the first step.

14. The control device according to claim 11, wherein:
   the at least two steps includes first and second steps;
   the engine output increase control means shifts from the first step to the second step upon satisfaction of one of the following conditions:
   an input shaft rotational speed of the gear shift mechanism is increased by a predetermined amount or more in the first step;
   the input shaft rotational speed of the gear shift mechanism is decreased by a predetermined amount or more in the first step;
   a gear ratio of the gear shift mechanism is increased by a predetermined amount or more in the first step; and
   the gear ratio of the gear shift mechanism is decreased by a predetermined amount or more in the first step.

15. The control device according to claim 11, wherein the engine output increase control means increases the throttle opening degree by an amount, which makes an engine rotational speed of the engine slightly higher than an input shaft rotational speed of the gear shift mechanism in the first step.

16. The control device according to claim 11, wherein the engine output increase control means progressively increases the throttle opening degree with time during the first step.

17. The control device according to claim 16, wherein when the engine output increase control means progressively increases the throttle opening degree with the time in the first step, the engine output increase control means stops the increasing of the throttle opening degree and maintains a current throttle opening degree of the engine at a timing, at which a difference between an engine rotational speed of the engine and a input shaft rotational speed of the gear shift mechanism becomes equal to or greater than a predetermined value.

18. The control device according to claim 11, wherein:
   the at least two steps includes first and second steps; and
   the engine output increase control means starts the first step simultaneously at one of:
   a time of starting the downshifting of the gear shift mechanism by the downshift control means from the current gear stage to the next gear stage; and
   a time of generating a disengaging command for disengaging an off-going friction element that is selected from the plurality of friction elements and has been placed in the engaged state in the current gear stage of the gear shift mechanism.

19. The control device according to claim 11, wherein:
   the at least two steps includes first and second steps; and
   the engine output increase control means starts the first step after elapse a predetermined time period from one of:
   a time of starting the downshifting of the gear shift mechanism by the downshift control means from the current gear stage to the next gear stage; and
   a time of generating a disengaging command for disengaging an off-going friction element, which is selected from the plurality of friction elements and has been placed in the engaged state in the current gear stage of the gear shift mechanism.

20. The control device according to claim 11, wherein when the downshift control means starts the downshifting of the gear shift mechanism from the current gear stage to the next gear stage, the downshift control means immediately decreases a hydraulic pressure command value of an off-going friction element, which is selected from the plurality of friction elements and has been placed in the engaged state in the current gear stage of the gear shift mechanism, to a value that is lower than a hydraulic pressure, which corresponds to a set load of a return spring of an on-coming friction element which is selected from the plurality of friction elements and is placed in the engaged state in the next gear stage of the gear shift mechanism.

21. A method for controlling an automatic transmission connected with an internal combustion engine of a vehicle, the method comprising:
controlling a hydraulic pressure of each corresponding one of a plurality of friction elements of a gear shift mechanism of the automatic transmission to downshift the gear shift mechanism from a current gear stage to a next gear stage, at which an engine brake is operated, upon receiving a driver's demand for deceleration; and
increasing an engine output of the engine by increasing a throttle opening degree of the engine in at least two steps in an absence of a driver's operation on an accelerator of the vehicle at the time of the downshifting of the gear shift mechanism from the current gear stage to the next gear stage.

22. The method according to claim 21, wherein the increasing of the engine output includes shifting from a first step of the at least two steps to a second step of the at least two steps when an input shaft rotational speed of the gear shift mechanism is increased by a predetermined amount or more in the first step.

23. The method according to claim 21, wherein the increasing of the engine output includes shifting from a first step of the at least two steps to a second step of the at least two steps when a gear ratio of the gear shift mechanism is increased by a predetermined amount or more in the first step.

24. The method according to claim 21, wherein the increasing of the engine output includes shifts from a first step of the at least two steps to a second step of the at least two steps upon satisfaction of one of the following conditions:
an input shaft rotational speed of the gear shift mechanism is increased by a predetermined amount or more in the first step;
the input shaft rotational speed of the gear shift mechanism is decreased by a predetermined amount or more in the first step;
a gear ratio of the gear shift mechanism is increased by a predetermined amount or more in the first step; and
the gear ratio of the gear shift mechanism is decreased by a predetermined amount or more in the first step.

25. The method according to claim 21, wherein the increasing of the engine output includes the increasing of the throttle opening degree by an amount, which makes an engine rotational speed of the engine slightly higher than an input shaft rotational speed of the gear shift mechanism in the first step.

26. The method according to claim 21, wherein the increasing of the throttle opening degree includes progressively increasing the throttle opening degree with time during the first step.

27. The method according to claim 26, wherein the progressively increasing of the throttle opening degree with the time during the first step includes stopping the increasing of the throttle opening degree and maintaining a current throttle opening degree of the engine at a timing, at which a difference between an engine rotational speed of the engine and a input shaft rotational speed of the gear shift mechanism becomes equal to or greater than a predetermined value.

28. The method according to claim 21, wherein the increasing of the engine output includes starting a first step of the at least two steps simultaneously at one of:
a time of starting the downshifting of the gear shift mechanism by the downshift control means from the current gear stage to the next gear stage; and
a time of generating a disengaging command for disengaging an off-going friction element that is selected from the plurality of friction elements and has been placed in the engaged state in the current gear stage of the gear shift mechanism.

29. The method according to claim 21, wherein the increasing of the engine output includes starting a first step of the at least two steps after elapse a predetermined time period from one of:
a time of starting the downshifting of the gear shift mechanism by the downshift control means from the current gear stage to the next gear stage; and
a time of generating a disengaging command for disengaging an off-going friction element, which is selected from the plurality of friction elements and has been placed in the engaged state in the current gear stage of the gear shift mechanism.

30. The method according to claim 21, wherein the downshifting of the gear shift mechanism from the current gear stage to the next gear stage includes immediately decreasing a hydraulic pressure command value of an off-going friction element, which is selected from the plurality of friction elements and has been placed in the engaged state in the current gear stage of the gear shift mechanism, to a value that is lower than a hydraulic pressure, which corresponds to a set load of a return spring of an on-coming friction element which is selected from the plurality of friction elements and is placed in the engaged state in the next gear stage of the gear shift mechanism.

* * * * *